(12) United States Patent
Wang et al.

(10) Patent No.: US 12,477,120 B2
(45) Date of Patent: Nov. 18, 2025

(54) KEYPOINTS BASED VIDEO COMPRESSION

(71) Applicant: Alibaba Damo (Hangzhou) Technology Co., Ltd., Zhejiang (CN)

(72) Inventors: Zhao Wang, Beijing (CN); Bolin Chen, Hong Kong (HK); Yan Ye, San Diego, CA (US); Shiqi Wang, Hong Kong (HK)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 128 days.

(21) Appl. No.: 18/484,134

(22) Filed: Oct. 10, 2023

(65) Prior Publication Data

US 2024/0129487 A1    Apr. 18, 2024

Related U.S. Application Data

(60) Provisional application No. 63/379,783, filed on Oct. 17, 2022.

(51) Int. Cl.
*H04N 19/00* (2014.01)
*G06T 3/18* (2024.01)
*G06T 3/20* (2006.01)
*G06T 3/60* (2006.01)
*H04N 19/154* (2014.01)
*H04N 19/169* (2014.01)

(52) U.S. Cl.
CPC ............. *H04N 19/154* (2014.11); *G06T 3/18* (2024.01); *G06T 3/20* (2013.01); *G06T 3/60* (2013.01); *H04N 19/169* (2014.11)

(58) Field of Classification Search
CPC ...... H04N 19/154; H04N 19/169; G06T 3/18; G06T 3/20; G06T 3/60
See application file for complete search history.

(56) References Cited

U.S. PATENT DOCUMENTS 5,633,956 A * 5/1997 Burl .................. H04N 7/0132
                                                 375/E7.193
5,909,224 A * 6/1999 Fung .................. H04N 19/423
                                                 348/718

(Continued)

FOREIGN PATENT DOCUMENTS

| | | |
|---|---|---|
| CN | 114170334 A | 3/2022 |
| CN | 114556941 A | 5/2022 |
| EP | 3110153 A1 | 12/2016 |

OTHER PUBLICATIONS

Ahmed et al., "Discrete cosine transform," IEEE transactions on Computers, vol. 100, No. 1, pp. 90-93, 1974.

(Continued)

*Primary Examiner* — Frank F Huang
(74) *Attorney, Agent, or Firm* — Finnegan, Henderson, Farabow, Garrett & Dunner, LLP

(57) ABSTRACT

Methods and apparatuses are provided for compressing video data based on keypoint features. An exemplary video compression method includes: receiving a video sequence; encoding one or more pictures of the video sequence; and generating a bitstream; wherein the encoding includes: representing a first picture by a first set of keypoints and a second set of keypoints, the second set comprising less keypoints than the first set; and compressing the video sequence based on the first set and second set of keypoints.

17 Claims, 13 Drawing Sheets

(56) References Cited

U.S. PATENT DOCUMENTS

| | | | | |
|---|---|---|---|---|
| 6,493,043 | B1* | 12/2002 | Bollmann | H04N 21/4341 |
| | | | | 348/553 |
| 6,642,968 | B1* | 11/2003 | Ford | H04N 21/44004 |
| | | | | 348/715 |
| 8,559,513 | B2* | 10/2013 | Demos | H04N 19/50 |
| | | | | 375/240.15 |
| 11,556,580 | B1* | 1/2023 | Ramnath | G06F 18/22 |
| 11,729,417 | B2* | 8/2023 | Bordes | H04N 19/70 |
| | | | | 375/240.16 |
| 11,792,419 | B2* | 10/2023 | Park | H04N 19/46 |
| | | | | 375/240.26 |
| 11,895,314 | B2* | 2/2024 | Paluri | H04N 19/174 |
| 2015/0271514 | A1 | 9/2015 | Yoshikawa et al. | |
| 2022/0038720 | A1* | 2/2022 | Hashimoto | H04N 19/174 |
| 2022/0103860 | A1 | 3/2022 | Demyanov et al. | |
| 2022/0312028 | A1* | 9/2022 | Li | H04N 19/139 |

OTHER PUBLICATIONS

Balle et al., End-to-End Optimized Image Compression, ICLR, 2017, 27 pages.

Balle et al., "Density modeling of images using a generalized normalization transformation," ICLR, 14 pages, 2016.

Blanz et al., "A morphable model for the synthesis of 3d faces," in Proceedings of the 26th annual conference on Computer graphics and interactive techniques, 1999, pp. 187-194.

Bross et al., "Overview of the Versatile Video Coding (VVC) Standard and Its Applications," IEEE Transactions on Circuits and Systems for Video Technology, vol. 31, No. 10, pp. 3736-3764, 2023.

Chen et al., "Beyond key-point coding: Temporal evolution inference with compact feature representation for talking face video compression," in Proceedings of the IEEE Data Compression Conference, 10 pages, 2022.

Ding et al., "Image Quality Assessment: Unifying Structure and Texture Similarity," IEE Transactions on Pattern Analysis and Machine Intelligence, vol. 44, No. 5, May 2022.

Farneback, "Two-frame motion estimation based on polynomial expansion," Image Analysis, pp. 363-370, 2003.

Feng et al., "A generative compression framework for low bandwidth video conference," in ICME Workshop, 6 pages 2021.

Goodfellow et al., "Generative adversarial nets," Advances in neural information processing systems, vol. 27, 9 pages, 2014.

Hu et al., "FVC: A New Framework towards Deep Video Compression in Feature Space," Proceedings of the IEEE/CVF Conference on Computer Vision and Pattern Recognition, 2021, pp. 1502-1511.

Jia et al., "Content-Aware Convolutional Neural Network for In-Loop Filtering in High Efficiency Video Coding," IEEE Transactions on Image Processing, vol. 28, No. 7, pp. 3343-3356 (2019).

Kingma et al., "Auto-encoding variational bayes," in Proceedings of the 2nd International Conference on Learning Representations (ICLR), 2014, p. 14.

Koufakis et al., "Very low bit rate face video compression using linear combination of 2d face views and principal components analysis," Image and Vision computing, vol. 17, No. 14, pp. 1031-1051, 1999.

Li et al., "Efficient, Multiple-Line-Based Intra Prediction for HEVC," IEEE Transactions on Circuits and Systems for Video Technology, vol. 28, No. 4, pp. 947-957, 2016.

Lin et al., "M-LVC: multiple frames prediction for learned video compression," in Proceedings of the IEEE/CVF Conference on Computer Vision and Pattern Recognition, 2020, pp. 3546-3554.

Lopez et al., "Head pose computation for very low bitrate video coding," in International Conference on Computer Analysis of Images and Patterns. Springer, 1995, pp. 440-447.

Lu et al., "Content adaptive and error propagation aware deep video compression," European Conference on Computer Vision. Springer, 2020, pp. 456-472.

Lu et al. "DVC: An end-to-end deep video compression framework," In Proceedings of the IEEE Conference on Computer Vision and Pattern Recognition, pp. 11006-11015, 2019.

Ma et al. "Convolutional neural network-based arithmetic coding for hevc intra-predicted residues," IEEE Transactions on Circuits and Systems for Video Technology, vol. 30, No. 7, pp. 1901-1916, 2019.

Oquab et al., "Low bandwidth video-chat compression using deep generative models," in Proceedings of the IEEE/CVF Conference on Computer Vision and Pattern Recognition, 2021, pp. 2388-2397.

Ronneberger et al., "U-net: Convolutional networks for biomedical image segmentation," in Medical Image Computing and Computer-Assisted Intervention, 8 pages, 2015.

Siarohin et al., "First Order Motion Model for Image Animation," Advances in Neural Information Processing Systems, vol. 32, pp. 7137-7147, 2019.

Simonyan et al., "Very deep convolutional networks for large scale image recognition," arXiv preprint, arXiv: 1409, 1556 (2015).

Sullivan et al., "Overview of the High Efficiency Video Coding (HEVC) Standard," IEE Transactions on Circuits and Systems for Video Technology, vol. 22, No. 12, pp. 1649-1668 (2012).

Torres et al., "A proposal for high compression of faces in video sequences using adaptive eigenspaces," in International Conference on image Processing. IEEE, 2002, vol. 1.

Wang et al., "One-shot free-view neural talking-head synthesis for video conferencing," in Proceedings of the IEEE/CVFConference on Computer Vision and Pattern Recognition, 2021, pp. 10039-10049.

Wang et al., "Few-shot video-to-video synthesis.," in NeurIPS, 2019, 14 pages.

Wiegand et al., "Overview of the H.264/AVC Video Coding Standard," IEEE Transactions on Circuitds and Systems for Video Technology, vol. 13, No. 7, Jul. 2003, pp. 560-576.

Wiles et al., "X2face: A network for controlling face generation using images, audio, and pose codes," in Proceedings of the European conference on computer vision (ECCV), 2018, pp. 670-686.

Yang et al., "Learning for video compression with hierarchical quality and recurrent enhancement," in Proceedings of the IEEE/CVF Conference on Computer Vision and Pattern Recognition, 2020, pp. 6628-6637.

Yang et al., "Learning for video compression with recurrent autoencoder and recurrent probability model," IEEE Journal of Selected Topics in Signal Processing, vol. 15, No. 2, pp. 388-401, 2020.

Zakharov et al., "Few-shot adversarial learning of realistic neural talking head models," in Proceedings of the IEEE/CVF International Conference on Computer Vision, 2019,pp. 9459-9468.

Zhao et al., Enhanced Bi-Prediction with convolutional neural network for high-efficiency video coding, IEEE Transactions on Circuits and Systems for Video Technology, vol. 29, No. 11, pp. 3291-3301, 2018.

Zhu et al., "Generative adversarial network-based intra prediction for video coding," IEEE transactions on multimedia, vol. 22, No. 1, pp. 45-58, 2019.

PCT International Search Report and Written Opinion mailed Dec. 21, 2023 issued in corresponding International Application No. PCT/CN2023/124825 (7 pgs.).

* cited by examiner

KEYPOINTS BASED VIDEO COMPRESSION

CROSS-REFERENCE TO RELATED APPLICATIONS

The disclosure claims the benefits of priority to U.S. Provisional Application No. 63/379,783, filed on Oct. 17, 2022, which is incorporated herein by reference in its entirety.

TECHNICAL FIELD

The present disclosure generally relates to video processing, and more particularly, to methods and apparatuses for keypoints based video compression.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods for processing video data. The method includes decomposing keypoint evolution between two frames into global motion and local motion, wherein the local motion comprises a set of keypoint differences; and signaling the keypoint differences.

Embodiments of the present disclosure provide methods for compressing video data. An exemplary video compression method includes: receiving a video sequence; encoding one or more pictures of the video sequence; and generating a bitstream; wherein the encoding includes: representing a first picture by a first set of keypoints and a second set of keypoints, the second set comprising less keypoints than the first set; and compressing the video sequence based on the first set and second set of keypoints.

Embodiments of the present disclosure provide an apparatus for compressing video data. The apparatus includes: a memory configured to store instructions; and one or more processors configured to execute the instructions to cause the apparatus to perform: representing a first picture by a first set of keypoints and a second set of keypoints, the second set comprising less keypoints than the first set; and compressing a video sequence based on the first set and second set of keypoints.

Embodiments of the present disclosure provide methods for decoding video data. An exemplary video decoding method includes: receiving a bitstream; and decoding, using coded information of the bitstream, one or more pictures, wherein the decoding includes: decoding warping data associated with a first set of keypoints and a second set of keypoints, the second set comprising less keypoints than the first set; and generating a first picture based on the first set of keypoints, the second set of keypoints, and the warping data.

Embodiments of the present disclosure provide an apparatus for decoding video data. The apparatus includes: a memory configured to store instructions; and one or more processors configured to execute the instructions to cause the apparatus to perform: decoding warping data associated with a first set of keypoints and a second set of keypoints, the second set comprising less keypoints than the first set; and generating a first picture based on the first set of keypoints, the second set of keypoints, and the warping data.

Embodiments of the present disclosure provide a non-transitory computer readable storage medium storing a bitstream of a video. The bitstream includes: a first set of keypoints and a second set of keypoints representing a first picture, the second set comprising less keypoints than the first set; and warping data associated with the first and second sets of keypoints, wherein the first set of keypoints, the second set of keypoints, and the warping data are used for generating the first picture.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The present disclosure provides methods and apparatuses for low-bit video compression. For example, the disclosed methods and apparatuses can be used for compressing talking face videos, and generate high quality video frames for end users at a given bandwidth budge. Such talking face video compression techniques are desirable because they enable conferencing or chat applications widely used in daily life and work. As described below, the disclosed methods and apparatuses are based on block-based video compressions techniques, deep learning based video compression techniques, talking face video compression techniques, etc.

Figure 1:
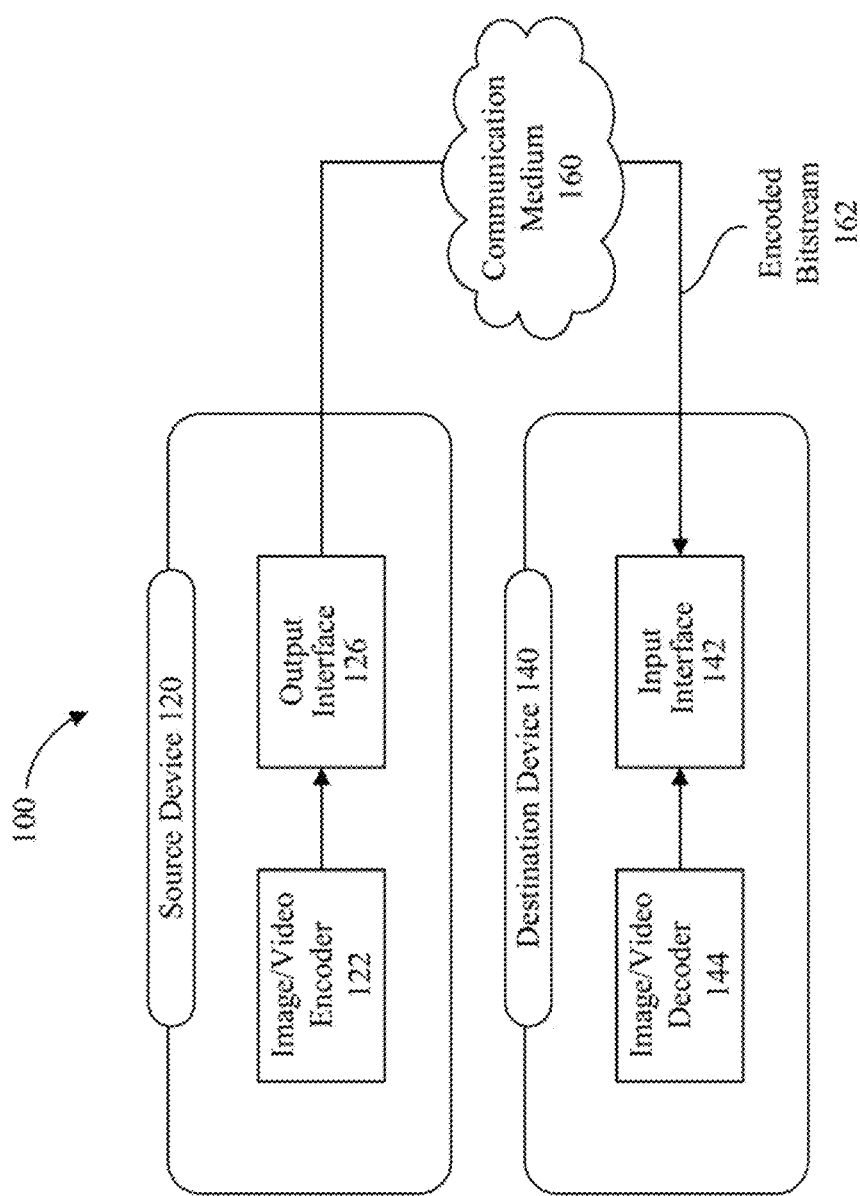
FIG. 1 is a schematic diagram illustrating an exemplary system for coding image data, according to some embodiments of the present disclosure.

FIG. 1 is a block diagram illustrating a system 100 for coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video encoder 124 an output interface 126. Destination device 140 may include an input interface 142 and an image/video decoder 144. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data.

More specifically, source device 120 may further include various devices (not shown) for providing source image data to be processed by Image/video encoder 124. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

System 100 can be configured to performing video encoding and decoding based on block-based video compression techniques, deep learning based video compression techniques, talking face video compression techniques, etc.

The block-based video compression techniques use a block-based hybrid video coding framework to exploit the spatial redundancy, temporal redundancy, and information entropy redundancy in videos. This hybrid video coding framework includes motion compensation (e.g., intra/inter prediction), transform (e.g., discrete cosine transform), quantization and entropy coding. The block-based video compression techniques can be made compliant with vvarious image/video coding standards, such as JPEG, JPEG2000, the H.264/MPEG4 part 10, Audio Video coding Standard (AVS), the H.265/HEVC standard, the Versatile Video Coding (VVC) standard, etc.

Figure 2:
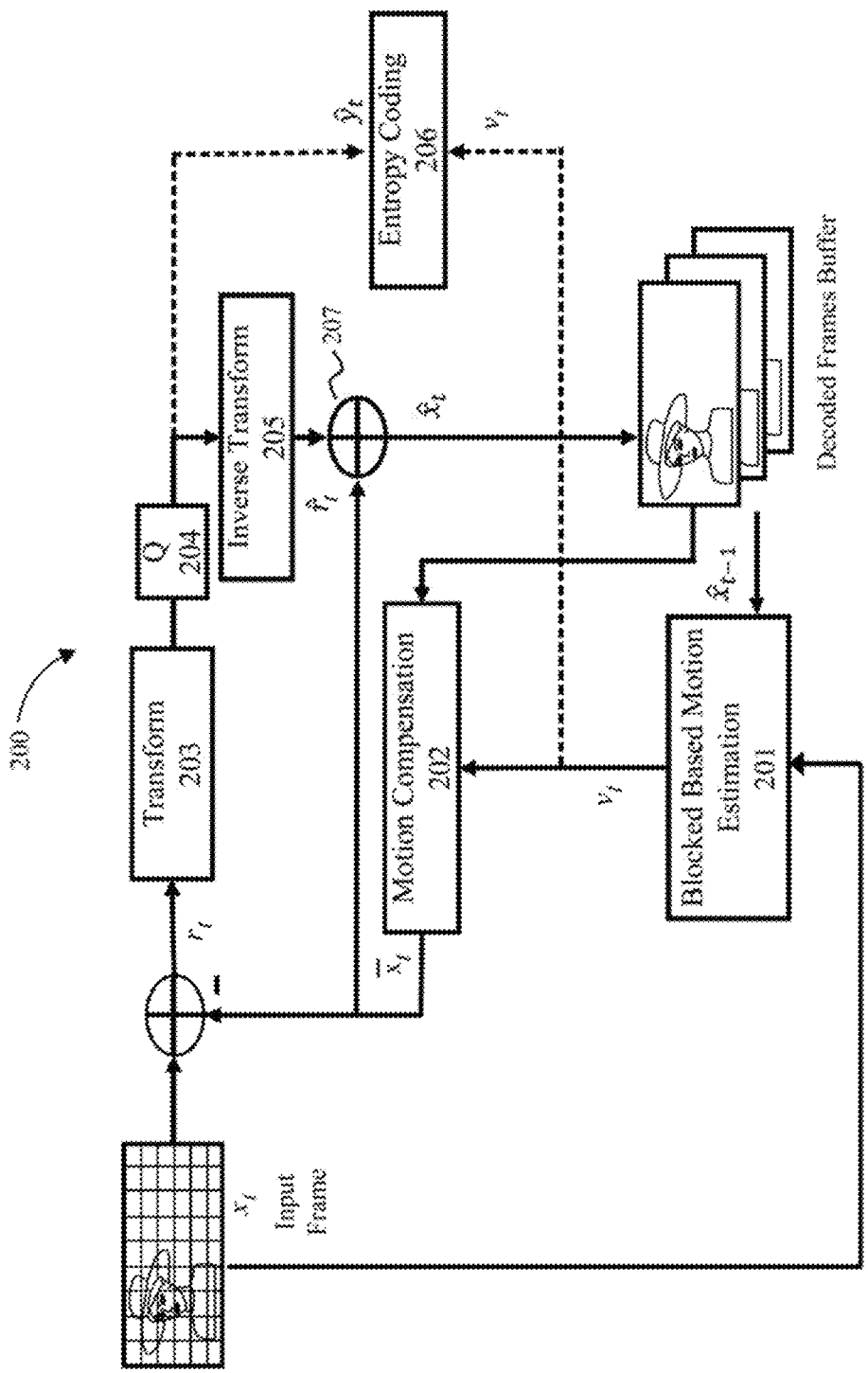
FIG. 2 is a schematic diagram illustrating an architecture of a block-based video compression framework, according to some embodiments of the present disclosure.

FIG. 2 is a schematic diagram illustrating a block-based video compression framework 200, according to some embodiments of the present disclosure. Block-based video compression framework 200 can include an encoder configured to generate bitstreams based on input video frames, and a decoder configured to reconstruct video frames based on the bitstreams. For simplicity, FIG. 2 only shows the encoder side of block-based video compression framework 200. It is contemplated that the decoder side of block-based video compression framework 200 reverses the operations at the encoder side.

Specifically, as shown in FIG. 2, the input frame $x_t$ of the encoder side is split into a set of blocks, e.g., square regions, of the same size (e.g., 8×8). The block-based video compression framework 200 includes the following steps.

Block-based video compression framework 200 performs motion estimation by using a block based motion estimation module 201. The motion estimation module 201 can estimate the motion between the current frame $x_t$ and the previous reconstructed frame $\hat{x}_{t-1}$. The corresponding motion vector $v_t$ for each block is obtained.

Block-based video compression framework 200 performs motion compensation by using a motion compensation module 202. The predicted frame $\bar{x}_t$ is obtained by copying the corresponding pixels in the previous reconstructed frame to the current frame based on the motion vector $v_t$ determined by motion estimation module 201. Then, the residual $r_t$ between the original frame $x_t$ and the predicted frame $\bar{x}_t$ is obtained as $r_t = x_t - \bar{x}_t$.

Block-based video compression framework 200 performs transform and quantization by using a transform module 203 and a Q module 204, respectively. The residual $r_t$ is quantized to $\hat{y}_t$ by Q module 204. A linear transform (e.g., DCT) is used before quantization by transform module 203 for better compression performance.

Block-based video compression framework 200 performs inverse transform by using an inverse transform module 205. The quantized result $\hat{y}_t$ is used by inverse transform for obtaining the reconstructed residual $\hat{r}_t$.

Block-based video compression framework 200 performs entropy coding by using an entropy coding module 206.

Both the motion vector $v_t$ and the quantized result $\hat{y}_t$ are encoded into one or more bitstreams by the entropy coding method and sent to the decoder.

Block-based video compression framework 200 performs frame reconstruction by using a reconstruction module 207. The reconstructed frame $\hat{x}_t$ is obtained by adding $\bar{x}_t$ and $\hat{r}_t$, i.e., $\hat{x}_t = \hat{r}_t + \bar{x}_t$. The reconstructed frame will be used by the $(t+1)_{th}$ frame for motion estimation.

The bitstreams generated by entropy coding module 206 can be decoded at the decoder side (not shown in FIG. 2). Motion compensation, inverse quantization, and frame reconstruction can be performed to obtain the reconstructed frame $\hat{x}_t$.

Figure 3:
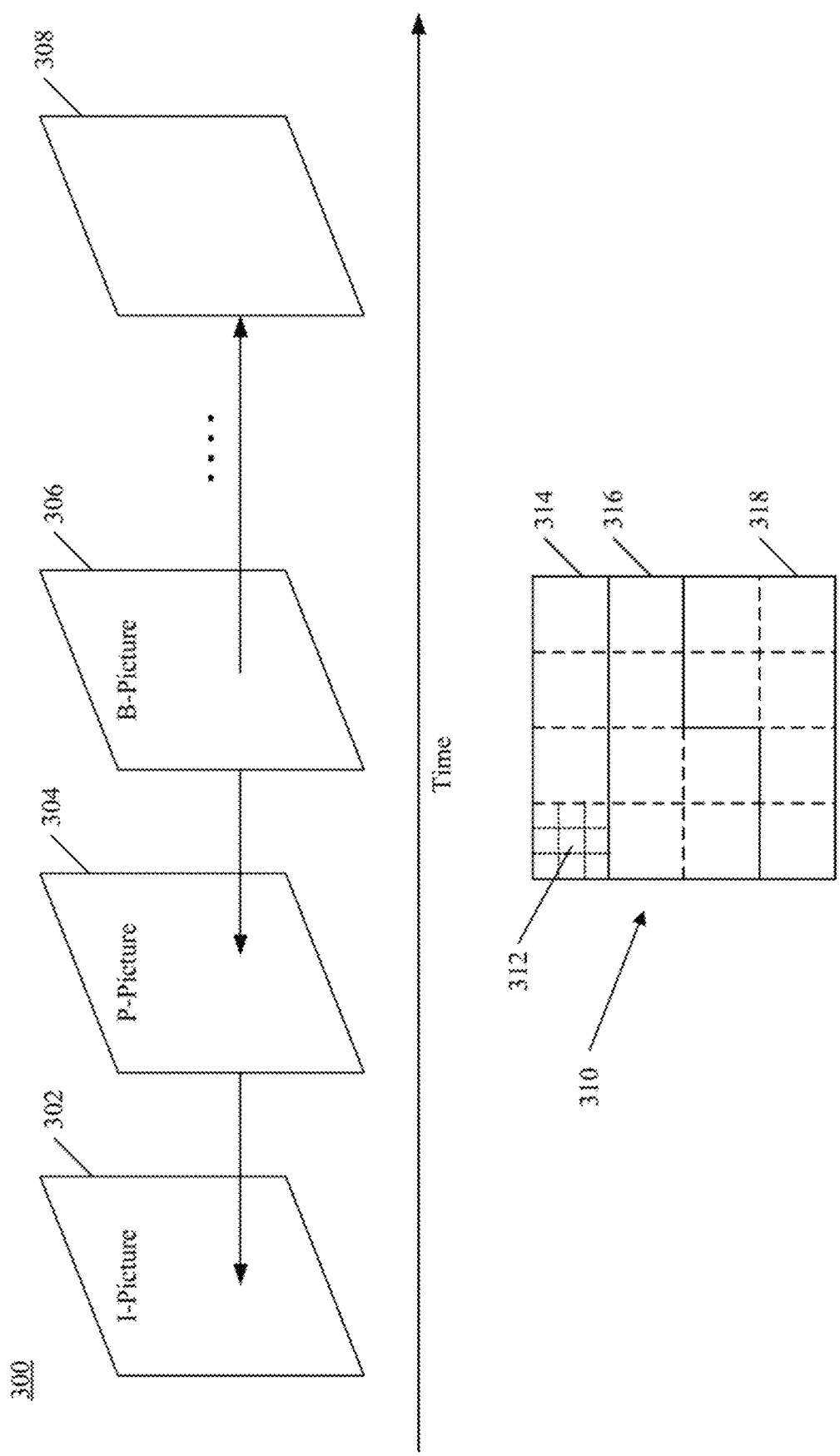
FIG. 3 is a schematic diagram illustrating structures of an example video sequence, according to some embodiments of the present disclosure.

The details of block-based video compression framework 200 are further described in connection with FIGS. 3, 4A, 4B, 5A, and 5B. Specifically, FIG. 3 illustrates structures of an example video sequence 300, according to some embodiments of the present disclosure. Video sequence 300 can be a live video or a video having been captured and archived. Video 300 can be a real-life video, a computer-generated video (e.g., computer game video), or a combination thereof (e.g., a real-life video with augmented-reality effects). Video sequence 300 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 3, video sequence 300 can include a series of pictures arranged temporally along a timeline, including pictures 302, 304, 306, and 308. Pictures 302-306 are continuous, and there are more pictures between pictures 306 and 308. In FIG. 3, picture 302 is an I-picture, the reference picture of which is picture 302 itself. Picture 304 is a P-picture, the reference picture of which is picture 302, as indicated by the arrow. Picture 306 is a B-picture, the reference pictures of which are pictures 304 and 308, as indicated by the arrows. In some embodiments, the reference picture of a picture (e.g., picture 304) can be not immediately preceding or following the picture. For example, the reference picture of picture 304 can be a picture preceding picture 302. It should be noted that the reference pictures of pictures 302-306 are only examples, and the present disclosure does not limit embodiments of the reference pictures as the examples shown in FIG. 3.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 310 in FIG. 3 shows an example structure of a picture of video sequence 300 (e.g., any of pictures 302-308). In structure 310, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, or AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC, H.266/VVC or AVS). Any operation performed to a basic processing unit can be repeatedly performed to each of its luma and chroma components.

Video coding has multiple stages of operations, examples of which are shown in FIGS. 4A-4B and FIGS. 5A-5B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, H.264/AVC, or AVS), or as "coding units" ("CUs") in some other video coding standards (e.g., H.265/HEVC, H.266/VVC, or AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 4A:
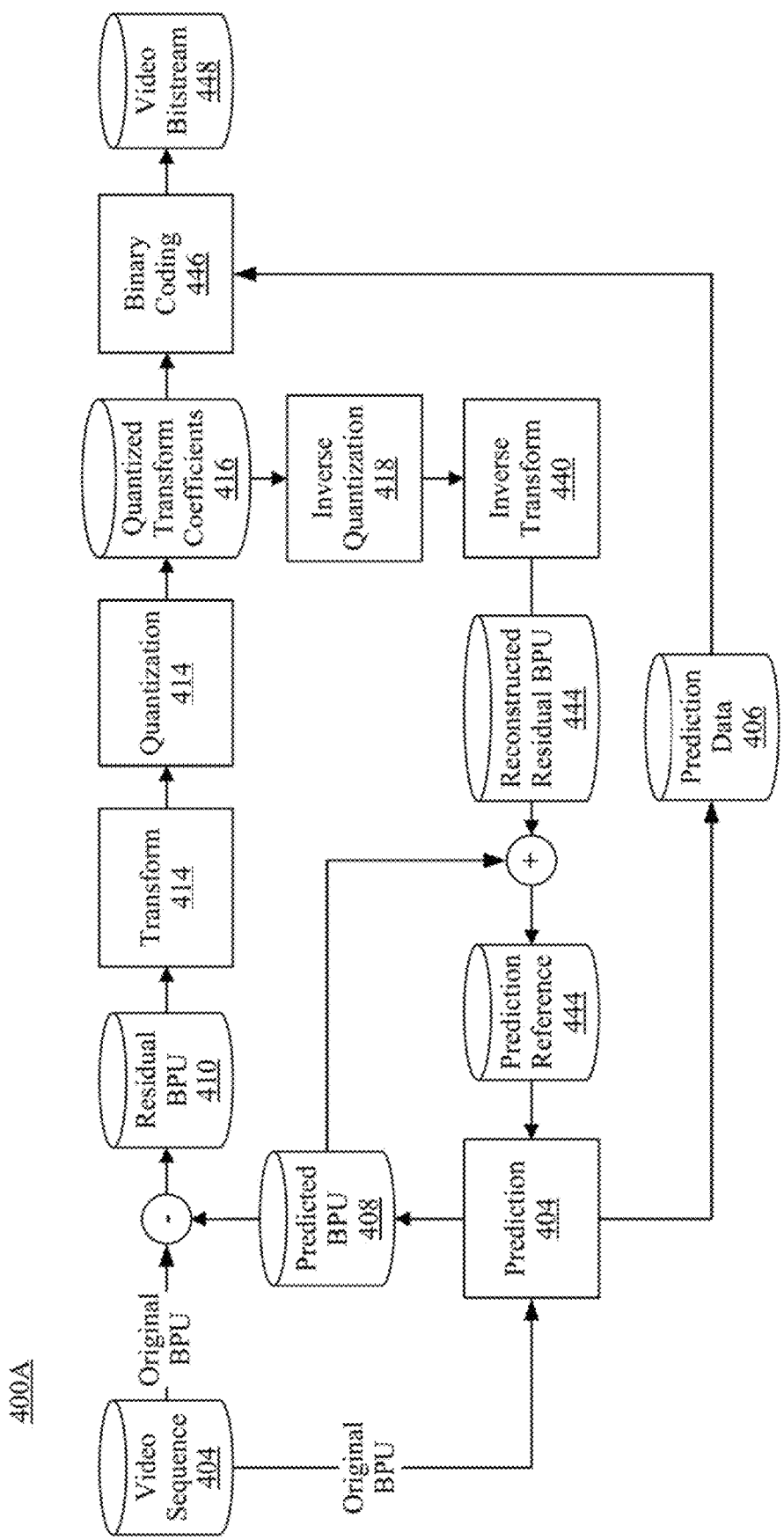
FIG. 4A is a schematic diagram illustrating an exemplary block-based encoding process, according to some embodiments of the present disclosure.
Figure 4B:
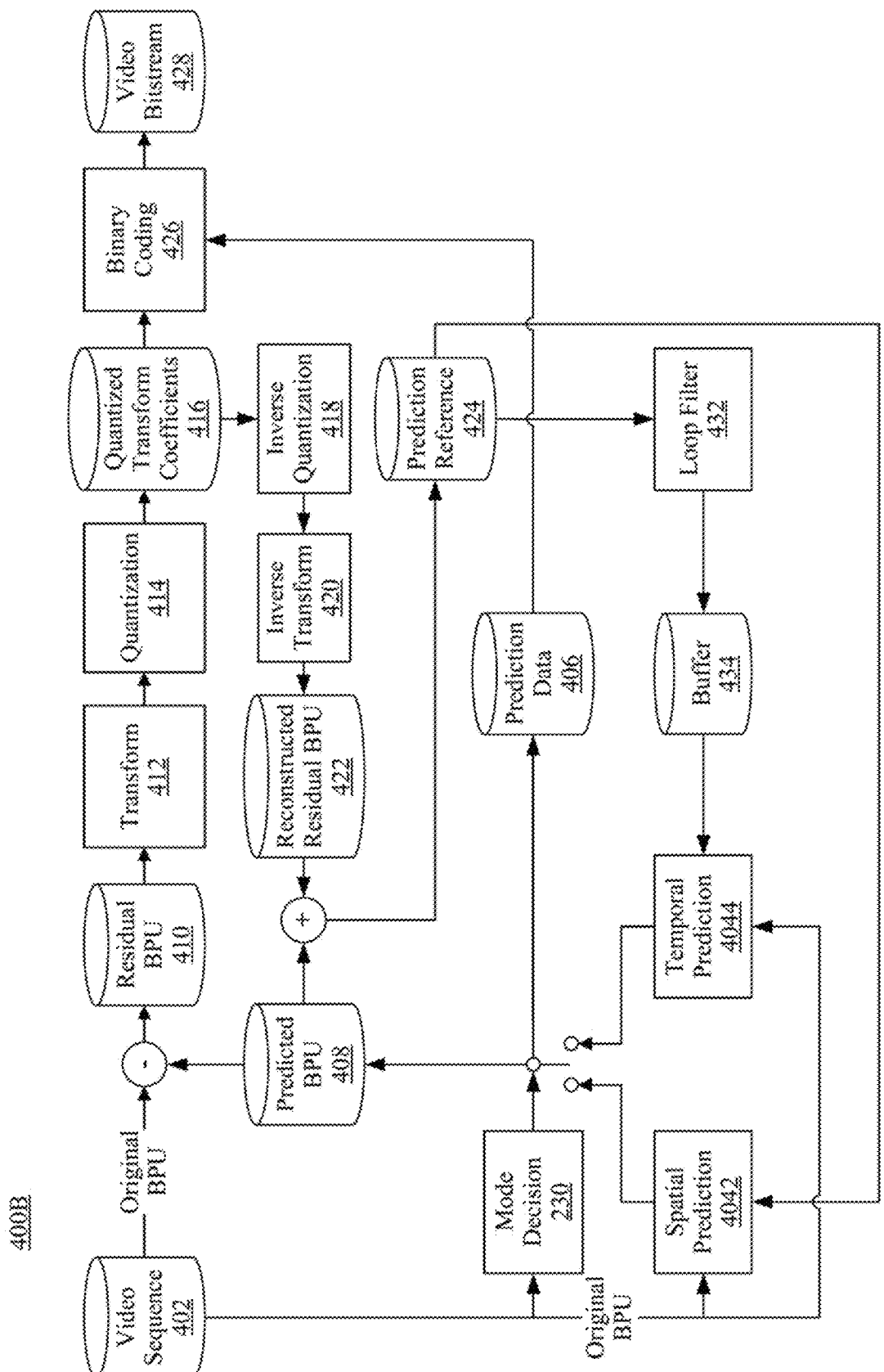
FIG. 4B is a schematic diagram illustrating another exemplary block-based encoding process, according to some embodiments of the present disclosure.

For example, at a mode decision stage (an example of which is shown in FIG. 4B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, or AVS), and decide a prediction type for each individual basic processing sub-unit.

For another example, at a prediction stage (an example of which is shown in FIGS. 4A-4B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC, H.266/VVC, or AVS), at the level of which the prediction operation can be performed.

For another example, at a transform stage (an example of which is shown in FIGS. 4A-4B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC, H.266/VVC, or AVS), at the level of which the transform operation can be performed. It should be noted that the division schemes of the same basic processing sub-unit can be different at the prediction stage and the transform stage. For example, in H.265/HEVC, H.266/VVC, or AVS, the prediction blocks and transform blocks of the same CU can have different sizes and numbers.

In structure 310 of FIG. 3, basic processing unit 312 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC, H.266/VVC and AVS provide two types of regions: "slices" and "tiles." It should also be noted that different pictures of video sequence 300 can have different partition schemes for dividing a picture into regions.

For example, in FIG. 3, structure 310 is divided into three regions 314, 316, and 318, the boundaries of which are shown as solid lines inside structure 310. Region 314 includes four basic processing units. Each of regions 316 and 318 includes six basic processing units. It should be noted that the basic processing units, basic processing sub-units, and regions of structure 310 in FIG. 3 are only examples, and the present disclosure does not limit embodiments thereof.

FIG. 4A illustrates a schematic diagram of an example encoding process 400A, consistent with embodiments of the disclosure. For example, the encoding process 400A can be performed by an encoder. As shown in FIG. 4A, the encoder can encode video sequence 402 into video bitstream 428 according to process 400A. Similar to video sequence 300 in FIG. 3, video sequence 402 can include a set of pictures (referred to as "original pictures") arranged in a temporal order. Similar to structure 310 in FIG. 3, each original picture of video sequence 402 can be divided by the encoder into basic processing units, basic processing sub-units, or regions for processing. In some embodiments, the encoder can perform process 400A at the level of basic processing units for each original picture of video sequence 402. For example, the encoder can perform process 400A in an iterative manner, in which the encoder can encode a basic processing unit in one iteration of process 400A. In some embodiments, the encoder can perform process 400A in parallel for regions (e.g., regions 314-318) of each original picture of video sequence 402.

In FIG. 4A, the encoder can feed a basic processing unit (referred to as an "original BPU") of an original picture of video sequence 402 to prediction stage 404 to generate prediction data 406 and predicted BPU 408. The encoder can subtract predicted BPU 408 from the original BPU to generate residual BPU 410. The encoder can feed residual BPU 410 to transform stage 412 and quantization stage 414 to generate quantized transform coefficients 416. The encoder can feed prediction data 406 and quantized transform coefficients 416 to binary coding stage 426 to generate video bitstream 428. Components 402, 404, 406, 408, 410, 412, 414, 416, 426, and 428 can be referred to as a "forward path." During process 400A, after quantization stage 414, the encoder can feed quantized transform coefficients 416 to inverse quantization stage 418 and inverse transform stage 420 to generate reconstructed residual BPU 422. The encoder can add reconstructed residual BPU 422 to predicted BPU 408 to generate prediction reference 424, which is used in prediction stage 404 for the next iteration of process 400A. Components 418, 420, 422, and 424 of process 400A can be referred to as a "reconstruction path." The reconstruction path can be used to ensure that both the encoder and the decoder use the same reference data for prediction.

The encoder can perform process 400A iteratively to encode each original BPU of the original picture (in the forward path) and generate predicted reference 424 for encoding the next original BPU of the original picture (in the reconstruction path). After encoding all original BPUs of the original picture, the encoder can proceed to encode the next picture in video sequence 402.

Referring to process 400A, the encoder can receive video sequence 402 generated by a video capturing device (e.g., a camera). The term "receive" used herein can refer to receiving, inputting, acquiring, retrieving, obtaining, reading, accessing, or any action in any manner for inputting data.

At prediction stage 404, at a current iteration, the encoder can receive an original BPU and prediction reference 424, and perform a prediction operation to generate prediction data 406 and predicted BPU 408. Prediction reference 424 can be generated from the reconstruction path of the previous iteration of process 400A. The purpose of prediction stage 404 is to reduce information redundancy by extracting prediction data 406 that can be used to reconstruct the original BPU as predicted BPU 408 from prediction data 406 and prediction reference 424.

Ideally, predicted BPU 408 can be identical to the original BPU. However, due to non-ideal prediction and reconstruction operations, predicted BPU 408 is generally slightly different from the original BPU. For recording such differences, after generating predicted BPU 408, the encoder can subtract it from the original BPU to generate residual BPU 410. For example, the encoder can subtract values (e.g., greyscale values or RGB values) of pixels of predicted BPU 408 from values of corresponding pixels of the original BPU. Each pixel of residual BPU 410 can have a residual value as a result of such subtraction between the corresponding pixels of the original BPU and predicted BPU 408. Compared with the original BPU, prediction data 406 and residual BPU 410 can have fewer bits, but they can be used to reconstruct the original BPU without significant quality deterioration. Thus, the original BPU is compressed.

To further compress residual BPU 410, at transform stage 412, the encoder can reduce spatial redundancy of residual BPU 410 by decomposing it into a set of two-dimensional "base patterns," each base pattern being associated with a "transform coefficient." The base patterns can have the same size (e.g., the size of residual BPU 410). Each base pattern can represent a variation frequency (e.g., frequency of brightness variation) component of residual BPU 410. None of the base patterns can be reproduced from any combinations (e.g., linear combinations) of any other base patterns. In other words, the decomposition can decompose variations of residual BPU 410 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 412, such as, for example, a discrete cosine transform, a discrete sine transform, or the like. The transform at transform stage 412 is invertible. That is, the encoder can restore residual BPU 410 by an inverse operation of the transform (referred to as an "inverse transform"). For example, to restore a pixel of residual BPU 410, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 410 without receiving the base patterns from the encoder. Compared with residual BPU 410, the transform coefficients can have fewer bits, but they can be used to reconstruct residual BPU 410 without significant quality deterioration. Thus, residual BPU 410 is further compressed.

The encoder can further compress the transform coefficients at quantization stage 414. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 414, the encoder can generate quantized transform coefficients 416 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 416, by which the transform coefficients are further compressed. The quantization process is also invertible, in which quantized transform coefficients 416 can be reconstructed to the transform coefficients in an inverse operation of the quantization (referred to as "inverse quantization").

Because the encoder disregards the remainders of such divisions in the rounding operation, quantization stage 414 can be lossy. Typically, quantization stage 414 can contribute the most information loss in process 400A. The larger the information loss is, the fewer bits the quantized transform coefficients 416 can need. For obtaining different levels of information loss, the encoder can use different values of the quantization parameter or any other parameter of the quantization process.

At binary coding stage 426, the encoder can encode prediction data 406 and quantized transform coefficients 416 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 406 and quantized transform coefficients 416, the encoder can encode other information at binary coding stage 426, such as, for example, a prediction mode used at prediction stage 404, parameters of the prediction operation, a transform type at transform stage 412, parameters of the quantization process (e.g., quantization parameters), an encoder control parameter (e.g., a bitrate control parameter), or the like. The encoder can use the output data of binary coding stage 426 to generate video bitstream 428. In some embodiments, video bitstream 428 can be further packetized for network transmission.

Referring to the reconstruction path of process 400A, at inverse quantization stage 418, the encoder can perform inverse quantization on quantized transform coefficients 416 to generate reconstructed transform coefficients. At inverse transform stage 420, the encoder can generate reconstructed residual BPU 422 based on the reconstructed transform coefficients. The encoder can add reconstructed residual BPU 422 to predicted BPU 408 to generate prediction reference 424 that is to be used in the next iteration of process 400A.

It should be noted that other variations of the process 400A can be used to encode video sequence 402. In some embodiments, stages of process 400A can be performed by the encoder in different orders. In some embodiments, one or more stages of process 400A can be combined into a single stage. In some embodiments, a single stage of process 400A can be divided into multiple stages. For example, transform stage 412 and quantization stage 414 can be combined into a single stage. In some embodiments, process 400A can include additional stages. In some embodiments, process 400A can omit one or more stages in FIG. 4A.

FIG. 4B illustrates a schematic diagram of another example encoding process 400B, consistent with embodiments of the disclosure. Process 400B can be modified from process 400A. For example, process 400B can be used by an encoder conforming to a hybrid video coding standard (e.g., H.26x series). Compared with process 400A, the forward path of process 400B additionally includes mode decision stage 430 and divides prediction stage 404 into spatial prediction stage 4042 and temporal prediction stage 4044. The reconstruction path of process 400B additionally includes loop filter stage 432 and buffer 434.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 424 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 424 in the temporal prediction can include the coded pictures. The temporal prediction can reduce the inherent temporal redundancy of the pictures.

Referring to process 400B, in the forward path, the encoder performs the prediction operation at spatial prediction stage 4042 and temporal prediction stage 4044. For example, at spatial prediction stage 4042, the encoder can perform the intra prediction. For an original BPU of a picture being encoded, prediction reference 424 can include one or more neighboring BPUs that have been encoded (in the forward path) and reconstructed (in the reconstructed path) in the same picture. The encoder can generate predicted BPU 408 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 408. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 406 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 4044, the encoder can perform the inter prediction. For an original BPU of a current picture, prediction reference 424 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 422 to predicted BPU 408 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 3), it can be deemed that the matching region "moves" to the location of the original BPU as time goes by. The encoder can record the direction and distance of such a motion as a "motion vector." When multiple reference pictures are used (e.g., as picture 306 in FIG. 3), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 406 can include, for example, locations (e.g., coordinates) of the matching region, the motion vectors associated with the matching region, the number of reference pictures, weights associated with the reference pictures, or the like.

For generating predicted BPU 408, the encoder can perform an operation of "motion compensation." The motion compensation can be used to reconstruct predicted BPU 408 based on prediction data 406 (e.g., the motion vector) and prediction reference 424. For example, the encoder can move the matching region of the reference picture according to the motion vector, in which the encoder can predict the original BPU of the current picture. When multiple reference pictures are used (e.g., as picture 306 in FIG. 3), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 304 in FIG. 3 is a unidirectional inter-predicted picture, in which the reference picture (e.g., picture 302) precedes picture 304. Bidirectional inter predictions can use one or more reference pictures at both temporal directions with respect to the current picture. For example, picture 306 in FIG. 3 is a bidirectional inter-predicted picture, in which the reference pictures (e.g., pictures 304 and 308) are at both temporal directions with respect to picture 304.

Still referring to the forward path of process 400B, after spatial prediction 4042 and temporal prediction stage 4044, at mode decision stage 430, the encoder can select a prediction mode (e.g., one of the intra prediction or the inter prediction) for the current iteration of process 400B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 408 and predicted data 406.

In the reconstruction path of process 400B, if intra prediction mode has been selected in the forward path, after generating prediction reference 424 (e.g., the current BPU that has been encoded and reconstructed in the current picture), the encoder can directly feed prediction reference 424 to spatial prediction stage 4042 for later usage (e.g., for extrapolation of a next BPU of the current picture). The encoder can feed prediction reference 424 to loop filter stage 432, at which the encoder can apply a loop filter to prediction reference 424 to reduce or eliminate distortion (e.g., blocking artifacts) introduced during coding of the prediction reference 424. The encoder can apply various loop filter techniques at loop filter stage 432, such as, for example, deblocking, sample adaptive offsets, adaptive loop filters, or the like. The loop-filtered reference picture can be stored in buffer 434 (or "decoded picture buffer") for later use (e.g., to be used as an inter-prediction reference picture for a future picture of video sequence 402). The encoder can store one or more reference pictures in buffer 434 to be used at temporal prediction stage 4044. In some embodiments, the encoder can encode parameters of the loop filter (e.g., a loop filter strength) at binary coding stage 426, along with quantized transform coefficients 416, prediction data 406, and other information.

Figure 5A:
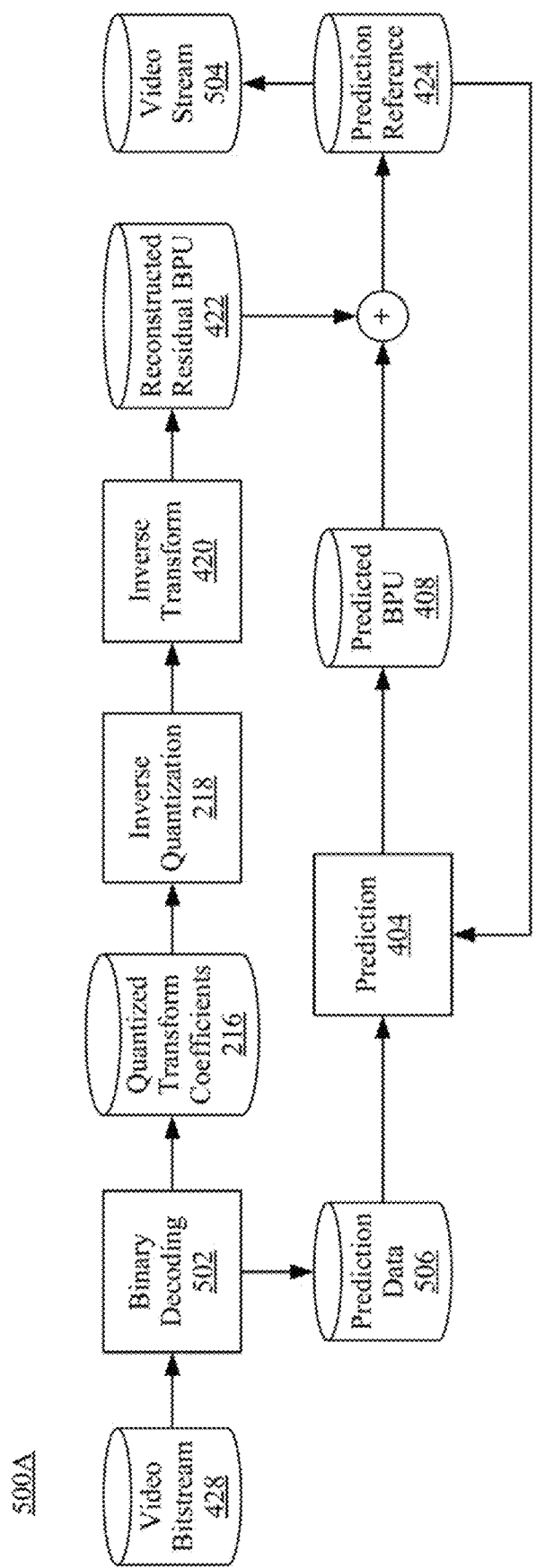
FIG. 5A is a schematic diagram illustrating an exemplary block-based decoding process, according to some embodiments of the present disclosure.

FIG. 5A illustrates a schematic diagram of an example decoding process 500A, consistent with embodiments of the disclosure. Process 500A can be a decompression process corresponding to the compression process 400A in FIG. 4A. In some embodiments, process 500A can be similar to the reconstruction path of process 400A. A decoder can decode video bitstream 428 into video stream 504 according to process 500A. Video stream 504 can be very similar to video sequence 402. However, due to the information loss in the compression and decompression process (e.g., quantization stage 414 in FIGS. 4A-4B), generally, video stream 504 is not identical to video sequence 402. Similar to processes 400A and 400B in FIGS. 4A-4B, the decoder can perform process 500A at the level of basic processing units (BPUs) for each picture encoded in video bitstream 428. For example, the decoder can perform process 500A in an iterative manner, in which the decoder can decode a basic processing unit in one iteration of process 500A. In some embodiments, the decoder can perform process 500A in parallel for regions (e.g., regions 314-318) of each picture encoded in video bitstream 428.

In FIG. 5A, the decoder can feed a portion of video bitstream 428 associated with a basic processing unit (referred to as an "encoded BPU") of an encoded picture to binary decoding stage 502. At binary decoding stage 502, the decoder can decode the portion into prediction data 406 and quantized transform coefficients 416. The decoder can feed quantized transform coefficients 416 to inverse quantization stage 418 and inverse transform stage 420 to generate reconstructed residual BPU 422. The decoder can feed prediction data 406 to prediction stage 404 to generate predicted BPU 408. The decoder can add reconstructed residual BPU 422 to predicted BPU 408 to generate predicted reference 424. In some embodiments, predicted reference 424 can be stored in a buffer (e.g., a decoded picture buffer in a computer memory). The decoder can feed predicted reference 424 to prediction stage 404 for performing a prediction operation in the next iteration of process 500A.

The decoder can perform process 500A iteratively to decode each encoded BPU of the encoded picture and generate predicted reference 424 for encoding the next encoded BPU of the encoded picture. After decoding all encoded BPUs of the encoded picture, the decoder can output the picture to video stream 504 for display and proceed to decode the next encoded picture in video bitstream 428.

At binary decoding stage 502, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 406 and quantized transform coefficients 416, the decoder can decode other information at binary decoding stage 502, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 428 is transmitted over a network in packets, the decoder can depacketize video bitstream 428 before feeding it to binary decoding stage 502.

Figure 5B:
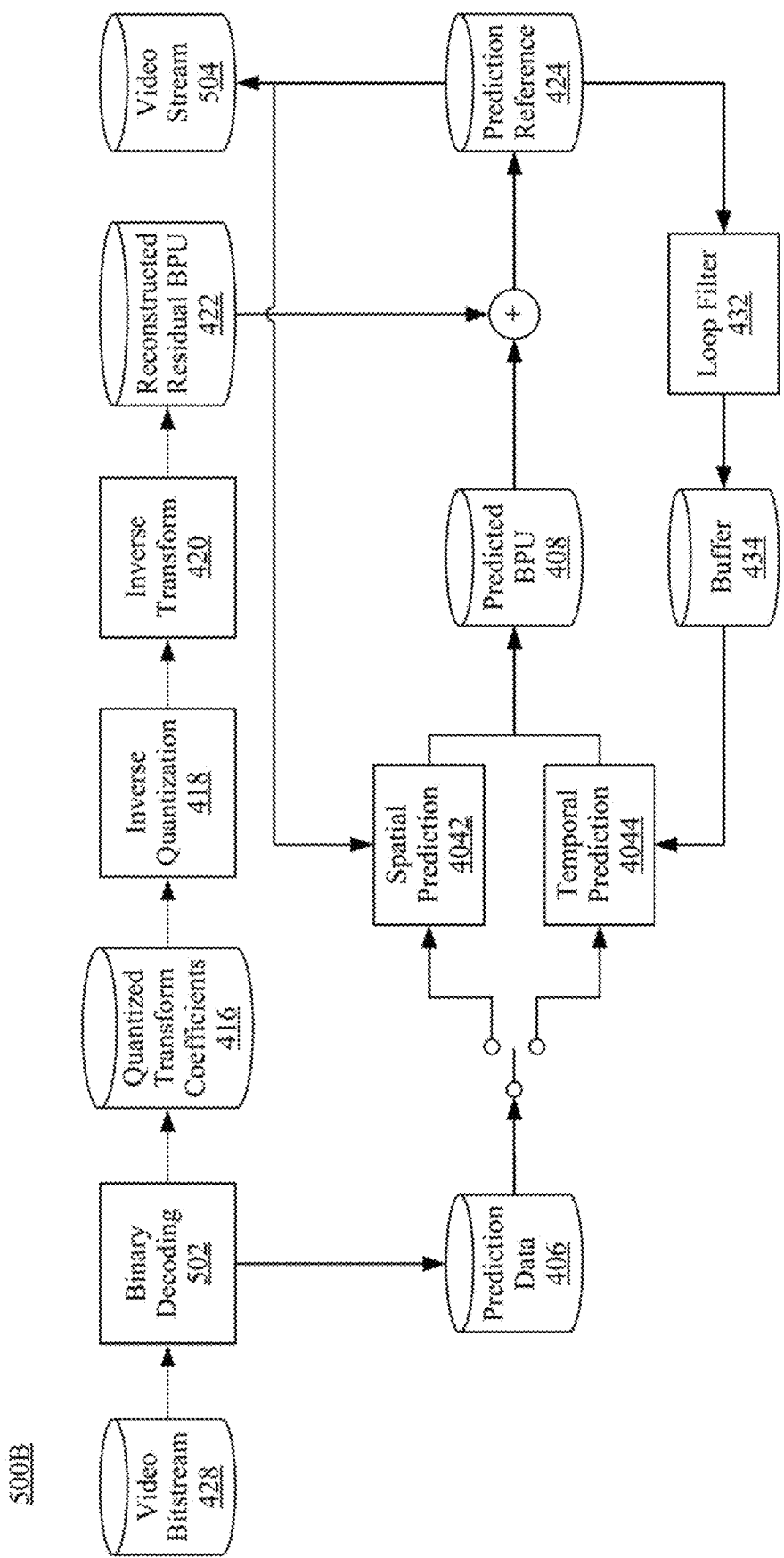
FIG. 5B is a schematic diagram illustrating another exemplary block-based decoding process, according to some embodiments of the present disclosure.

FIG. 5B illustrates a schematic diagram of another example decoding process 500B, consistent with embodiments of the disclosure. Process 500B can be modified from process 500A. For example, process 500B can be used by a decoder conforming to a hybrid video coding standard (e.g., H.26x series). Compared with process 500A, process 500B additionally divides prediction stage 404 into spatial prediction stage 4042 and temporal prediction stage 4044, and additionally includes loop filter stage 432 and buffer 434.

In process 500B, for an encoded basic processing unit (referred to as a "current BPU") of an encoded picture (referred to as a "current picture") that is being decoded, prediction data 406 decoded from binary decoding stage 502 by the decoder can include various types of data, depending on what prediction mode was used to encode the current BPU by the encoder. For example, if intra prediction was used by the encoder to encode the current BPU, prediction data 406 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 406 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 4042 or a temporal prediction (e.g., the inter prediction) at temporal prediction stage 4044. The details of performing such spatial prediction or temporal prediction are described in FIG. 4B and will not be repeated hereinafter. After performing such spatial prediction or temporal prediction, the decoder can generate predicted BPU 408. The decoder can add predicted BPU 408 and reconstructed residual BPU 422 to generate prediction reference 424, as described in FIG. 5A.

In process 500B, the decoder can feed predicted reference 424 to spatial prediction stage 4042 or temporal prediction stage 4044 for performing a prediction operation in the next iteration of process 500B. For example, if the current BPU is decoded using the intra prediction at spatial prediction stage 4042, after generating prediction reference 424 (e.g., the decoded current BPU), the decoder can directly feed prediction reference 424 to spatial prediction stage 4042 for later usage (e.g., for extrapolation of a next BPU of the current picture). If the current BPU is decoded using the inter prediction at temporal prediction stage 4044, after generating prediction reference 424 (e.g., a reference picture in which all BPUs have been decoded), the decoder can feed prediction reference 424 to loop filter stage 432 to reduce or eliminate distortion (e.g., blocking artifacts). The decoder can apply a loop filter to prediction reference 424, in a way as described in FIG. 4B. The loop-filtered reference picture can be stored in buffer 434 (e.g., a decoded picture buffer in a computer memory) for later use (e.g., to be used as an inter-prediction reference picture for a future encoded picture of video bitstream 428). The decoder can store one or more reference pictures in buffer 434 to be used at temporal prediction stage 4044. In some embodiments, prediction data can further include parameters of the loop filter (e.g., a loop filter strength). In some embodiments, prediction data includes parameters of the loop filter when the prediction mode indicator of prediction data 406 indicates that inter prediction was used to encode the current BPU.

In addition to the block-based video compression techniques, deep learning can be used in video compression, to achieve competitive performance compared with traditional compression schemes. For example, end-to-end image compression algorithms show better rate-distortion (RD) performance than JPEG, JPEG2000 and even HEVC due to end-to-end training and non-linear transform. Moreover, the video compression algorithms based on Deep Neural Networks (DNNs), such as deep video compression model (DVC), can achieve promising RD performance. These schemes can work without the prior knowledge of the video content. Regarding the applications of video conferencing/telephone, deep generative models, such as First Order Motion Model (FOMM) and Face Video-to-Video Synthesis (Face_vid2vid), can achieve promising performance at ultra-low bit rate. In particular, these models leverage the fact that the variations of these videos typically lie in the human motion information, providing the strong priors that can be used in frame synthesis. These features are described by the variations of human structures, such as landmarks or key points, and are further conveyed to animate the reference frame and generate the human motion video.

Deep learning-based algorithms can be used to replace or enhance some operations or functions of the block-based video coding tools, including intra/inter prediction, entropy coding, in-loop filtering, etc. Regarding the joint optimization of the entire image/video compression framework rather than designing one particular module, end-to-end image/video compression algorithms can be used. For example, an end-to-end video coding scheme DVC scheme that jointly optimizes all the components for video compression can be used. Furthermore, to address the content adaptive and error propagation aware problems, an online encoder updating scheme can be used to improve the video compression performance. In addition, a FVC by developing all major modules of the end-to-end compression framework in the feature space can be used. Based on recurrent probability model and weighted recurrent quality enhancement network, a Recurrent Learning for Video Compression (RLVC) and HLVC can be used to exploit the temporal correlation among video frames. Four effective modules in Multiple Frames Prediction for Learned Video Compression (M-LVC) can be used. However, like the traditional video coding tools, these learning-based video compression methods aim at the universal natural scenes without the specific consideration of the human content, such as face, body or other parts.

Figure 6:
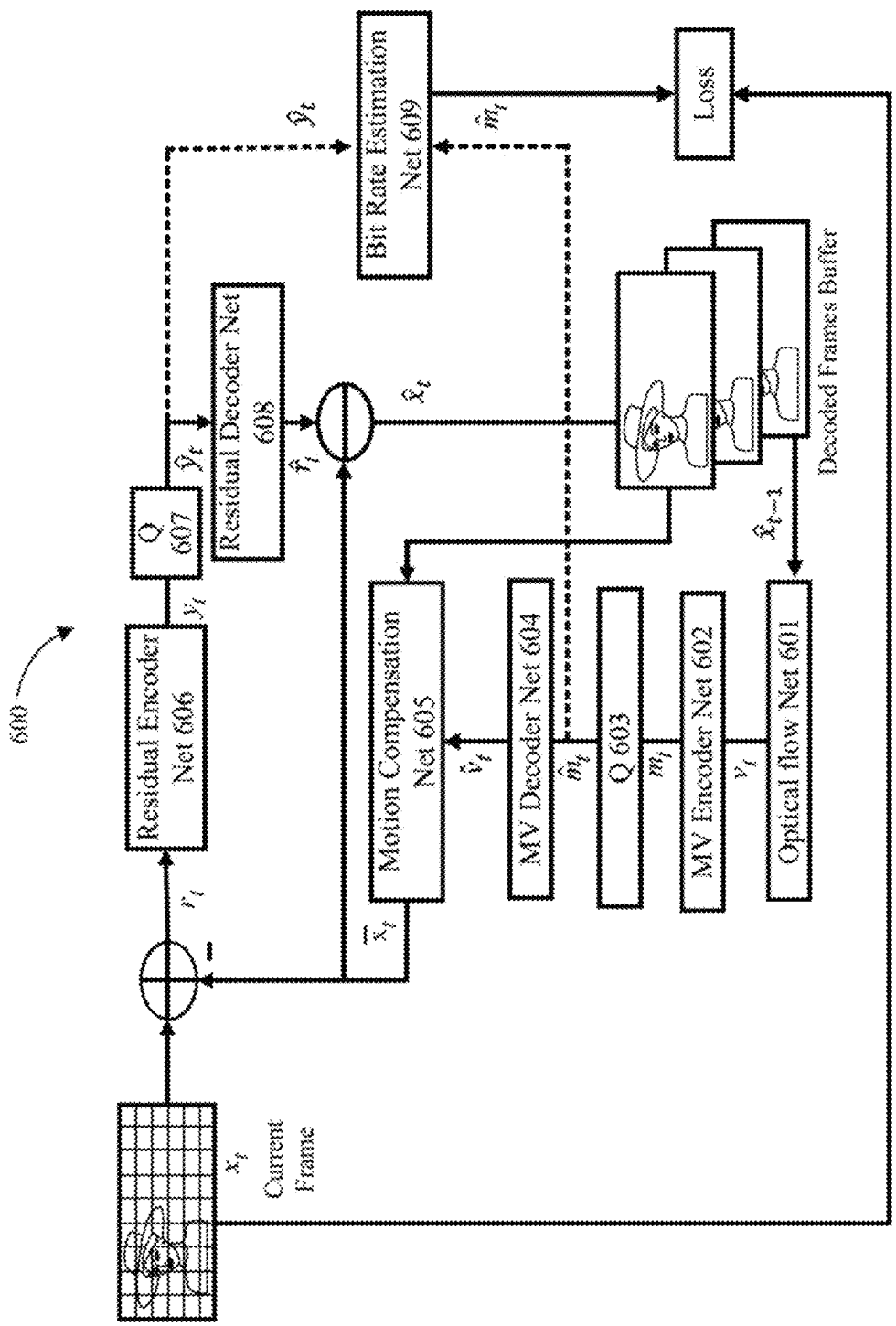
FIG. 6 is a schematic diagram illustrating an exemplary architecture of an end-to-end deep learning based video compression framework, according to some embodiments of the present disclosure.

FIG. 6 is a schematic diagram illustrating an exemplary architecture of an end-to-end deep learning based video compression framework 600, according to some embodiments of the present disclosure. Framework 600 uses various deep learning models that jointly optimize the components of video compression, such as motion estimation, motion compression, and residual compression. Specifically, learning based optical flow estimation is utilized to obtain the motion information and reconstruct the current frames. Then two auto-encoder style neural networks are employed to compress the corresponding motion and residual information. The modules in framework 600 are jointly learned through a single loss function, in which they collaborate with each other by considering the trade-off between reducing the number of compression bits and improving quality of the decoded video. There is one-to-one correspondence between block-based video compression framework 200 shown in FIG. 2 and end-to-end deep learning based video compression framework 600 shown in FIG. 6. The relationship and brief summarization on the differences are introduced as follows. End-to-end deep learning based video compression framework 600 can include an encoder configured to generate bitstreams based on input video frames, and a decoder configured to reconstruct video frames based on the bitstreams. For simplicity, FIG. 6 only shows the encoder side of end-to-end deep learning based video compression framework 600.

As shown in FIG. 6, framework 600 can perform motion estimation and compression. In optical flow net module 601, a CNN (Convolutional Neural Network) model can be used to estimate the optical flow, which is considered as motion information $v_t$. Instead of directly encoding the raw optical flow values, an MV encoder-decoder network to compress and decode the optical flow values. Firstly, MV encoder net module 602 can be used to encode the motion information $v_t$. The encoded motion representation of motion information $v_t$ is $m_t$, which can be further quantized, by Q module 603, as $\hat{m}_t$. Then the corresponding reconstructed motion information $\hat{v}_t$ can be decoded by using MV decoder net module 604.

Framework 600 can also perform motion compensation. A motion compensation network donated as motion compensation net module 605 is designed to obtain the predicted frame $\bar{x}_t$ based on the optical flow obtained. Then, the residual $r_t$ between the original frame $x_t$ and the predicted frame $\bar{x}_t$ is obtained as $r_t = x_t - \bar{x}_t$.

Framework 600 can also perform transform, quantization and inverse transform. The linear transform is replaced by using a highly non-linear residual encoder-decoder network, such as the residual encoder net module 606 shown in FIG. 6, and the residual $r_t$ is non-linearly mapped to the representation $y_t$. Then $y_t$ is quantized to $\hat{y}_t$ by Q module 607. In order to build an end-to-end training scheme, the quantization method is used. The quantized representation $\hat{y}_t$ is fed into the residual decoder network donated as residual decoder net module 608 to obtain the reconstructed residual $\hat{r}_t$.

Framework 600 can also perform entropy coding. At the testing stage, the quantized motion representation $\hat{m}_t$ and the residual representation $\hat{y}_t$ are coded into bits by bit rate estimation net module 609 and sent to the decoder. At the training stage, to estimate the number of bits cost, the CNNs are used to obtain the probability distribution of each symbol in $\hat{m}_t$ and $\hat{y}_t$.

Moreover, the loss of the framework 600 can be determined according to the original frame, the reconstructed frame, and the encoded frame. The loss determined here can also be used to refine the networking within the framework 600 for achieving a better performance.

Framework 600 can also perform frame reconstruction (not shown in FIG. 6), in the same way as the frame reconstruction described in connection with framework 200.

End-to-end deep learning based video compression framework 600 can be used in facial video compression, e.g., talking face generative video coding. For example, the end-to-end deep learning based talking face generative video coding can use generative models such as Variational Auto-Encoding (VAE) and Generative Adversarial Networks (GAN). The facial video compression can achieve promising performance improvement. For example, X2Face can be used to control face generation via images, audio, and pose codes. Besides, realistic neural talking head models can be used via few-shot adversarial learning. For video-to-video synthesis tasks, Face-vidtovid can be used. Moreover, schemes that leverage compact 3D keypoint representation to drive a generative model for rendering the target frame can also be used. Moreover, mobile-compatible video chat systems based on FOMM can be used. VSBNet that utilizes the adversarial learning to reconstruct origin frames from the landmarks can also be used. In addition, an end-to-end talking-head video compression framework based upon compact feature learning (CFTE), designed for high efficiency talking face video compression towards ultra low bandwidth scenarios can be used. The CFTE scheme leverages the compact feature representation to compensate for the temporal evolution and reconstruct the target face video frame in an end-to-end manner. Moreover, the CFTE scheme can be incorporated into the video coding framework with the supervision of rate-distortion objective. Although these algorithms realize frame reconstruction with a few facial parameters through the powerful rendering ability of deep generative models, some head posture movements and facial expression movements still fail to be accurately rendered compared with the original moving video.

Figure 7:
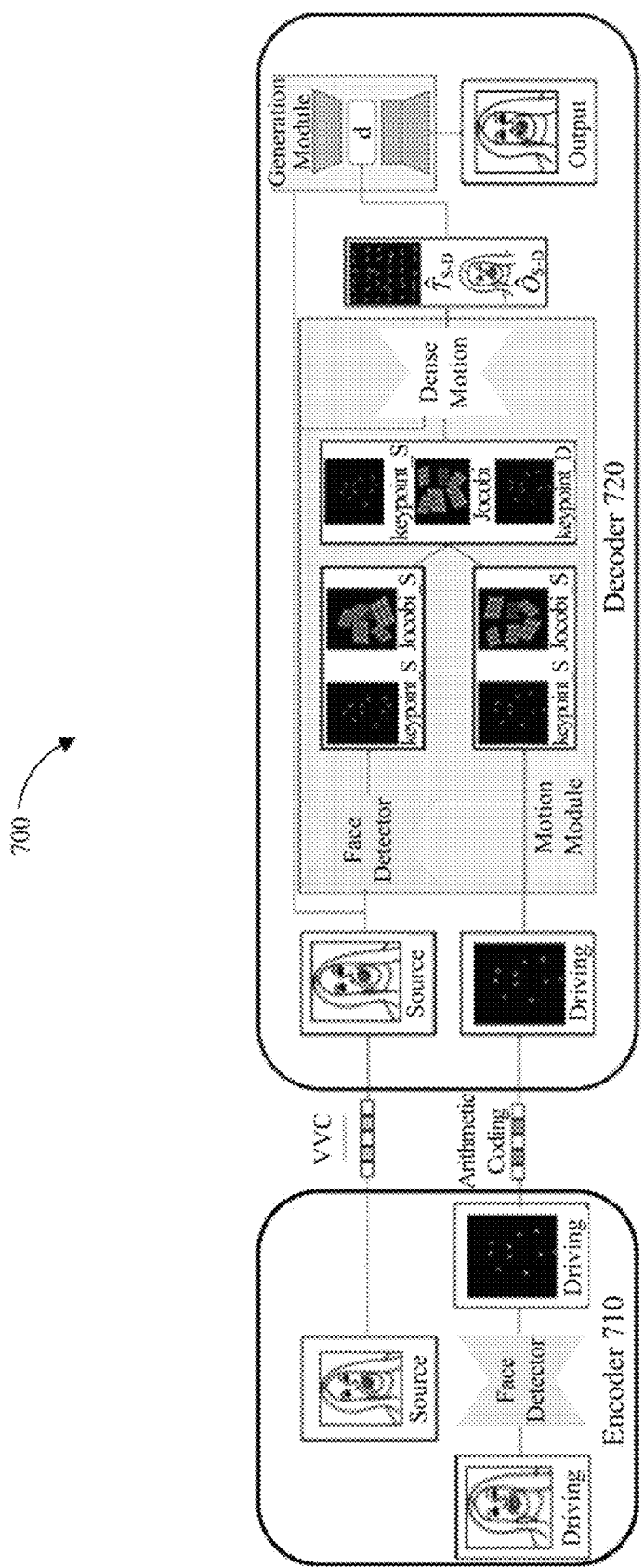
FIG. 7 is a schematic diagram illustrating an exemplary architecture of a deep learning based video generative compression framework, according to some embodiments of the present disclosure.

FIG. 7 is a schematic diagram illustrating an exemplary deep learning based video generative compression framework 700, according to some embodiments of the present disclosure. Framework 700 is suitable for compressing and generating talking face videos. For example, framework 700 can be based on the First Order Motion Model (FOMM). The FOMM deforms a reference source frame to follow the motion of a driving video. While this method works on various types of videos (for example, motion pictures, cartoons), this method can also be used for face animation applications. FOMM follows an encoder-decoder architecture with a motion transfer component including the following steps.

Firstly, a keypoint extractor (also referred to as a motion module) is learned using an equivariant loss, without explicit labels. By this keypoint extractor, two sets of ten learned keypoints are computed for the source and driving frames. The learned keypoints is transformed from the feature map with the size of channel×64×64 via the Gaussian map function, thus every corresponding keypoint can represent different channels feature information. It should be mentioned that every keypoint is point of (x, y) that can represent the most important information of feature map.

Secondly, a dense motion network uses the landmarks and the source frame to produce a dense motion field and an occlusion map.

Then, the encoder 710 encodes the source frame via the traditional image/video compression method, such as HEVC/VVC or JPEG/BPG. Here, the VVC is used to compress the source frame.

In the later stage, the resulting feature map is warped using the dense motion field (using a differentiable grid-sample operation), then multiplied with the occlusion map. Lastly, the decoder 720 generates an image from the warped map.

Figure 8:
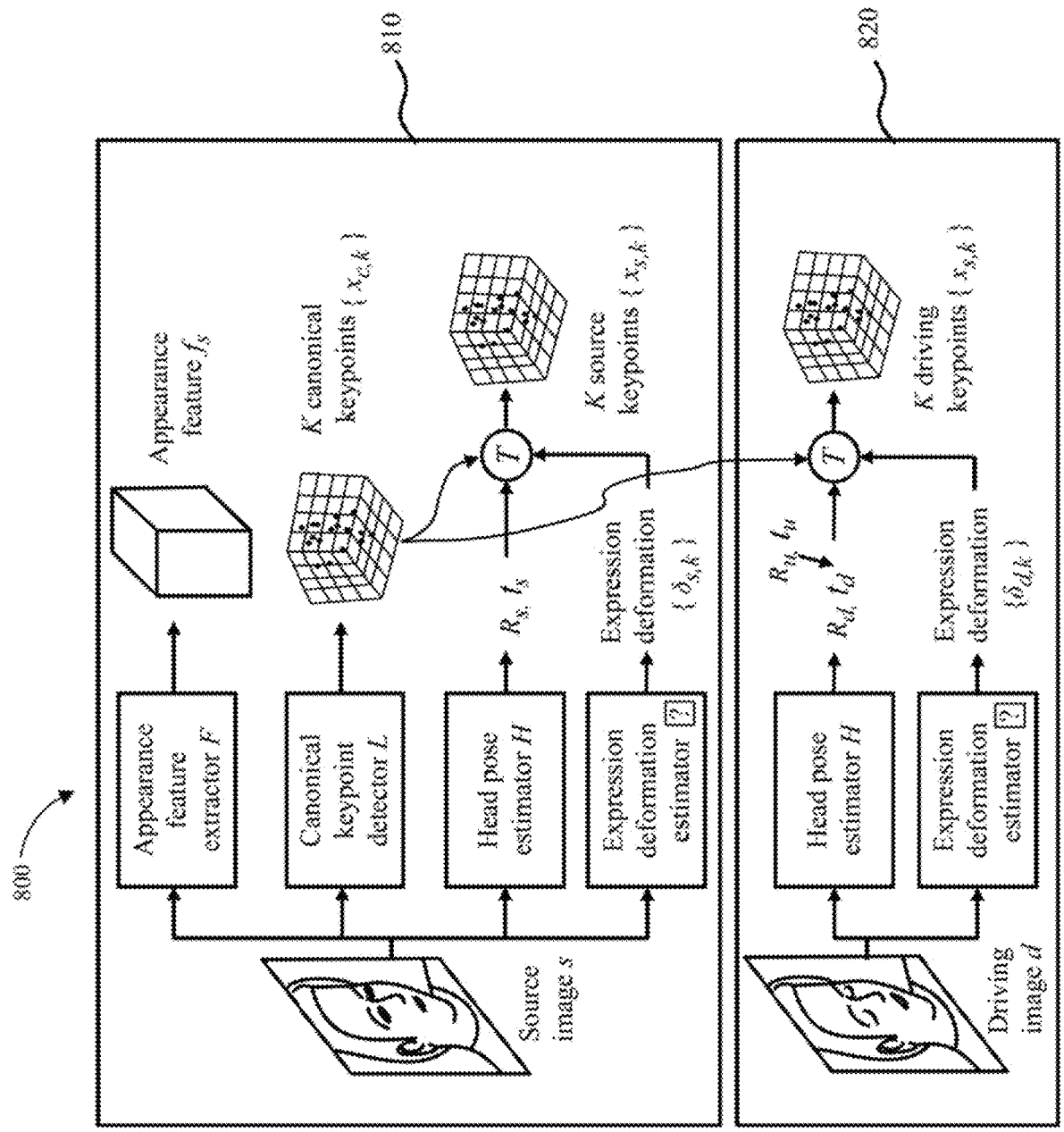
FIG. 8 is a schematic diagram illustrating another exemplary architecture of a deep learning based video generative compression framework, according to some embodiments of the present disclosure.

FIG. 8 is a schematic diagram illustrating another exemplary deep learning based video generative compression framework 800, according to some embodiments of the present disclosure. The encoding and decoding in framework 800 are based on 3D keypoints. The key ingredient of framework 800 is an unsupervised approach for learning a set of 3D keypoints and their decomposition. The keypoints can be decomposed into two parts, one that models the facial expressions and the other that models the geometric signature of a person. These two parts are combined with the target head pose to generate the image-specific keypoints. After the keypoints are estimated, they are then used to learn a mapping function between two images. These steps can be implemented using a set of networks and training them jointly.

As shown in FIG. 8, framework 800 includes a source image feature extraction module 810 and a driving video feature extraction 820. Specifically, source image s can be an image of a person. Moreover, a plurality of driving images $\{d_1, d_2, \ldots, d_N\}$ constitute a talking-head video, called the driving video, where $d_i$'s are the individual frames, and N is the total number of frames. Framework 800 can be used to generate an output video $\{y_1, y_2, \ldots, y_N\}$, where the identity in $y_i$'s is inherited from s and the motions are derived from $d_i$'s. Consistent with the disclosed embodiments, when s is a frame of the driving video (e.g., $s=d_1$), framework 800 can be configured to perform a video reconstruction task. While when s is not from the driving video, framework 800 can be configured to perform a motion transfer task.

Synthesizing a talking-head requires knowing the appearance of the person, such as the skin and eye colors. As shown in FIG. 8, source image feature extraction module 810 first applies a 3D appearance feature extraction network F to map the source image s to a 3D appearance feature volume $f_s$. Unlike a 2D feature map, $f_s$ has three spatial dimensions: width, height, and depth. Mapping to a 3D feature volume allows framework 800 to operate the keypoints in the 3D space for rotating and translating the talking-head during synthesis.

Source image feature extraction module 810 also extracts a set of k 3D keypoints $x_{c,k}$ from the source image s using a canonical 3D keypoint detection network L. K can be any value suitable for the video compression. For example, k can be set to be equal to 20. These keypoints are learned without supervision, and thus are different from the common facial landmarks. The extracted keypoints are independent of the face's pose and expression, and are used for encoding a person's geometry signature in a neutral pose and expression.

Next, source image feature extraction module 810 extracts pose and expression information from the image. Source image feature extraction module 810 uses a head pose estimation network H to estimate the head pose of the person in the source image s, parameterized by a rotation matrix $R_s$ and a translation vector $t_s$. In addition, source image feature extraction module 810 uses an expression deformation estimation network $\Delta$ to estimate a set of k 3D deformations $\delta_{s,k}$—the deformations of keypoints from the neutral expression. Both H and $\Delta$ extract motion-related geometry information in the image. Source image feature extraction module 810 combines the identity-specific information extracted by canonical 3D keypoint detection network L with the motion-related information extracted by H and $\Delta$, to obtain the source 3D keypoints $x_{s,k}$ via a transformation T:

$$x_{s,k}=T(x_{c,k},R_s,t_s,\delta_{s,k})=R_s x_{c,k}+t_s+\delta_{s,k} \quad (1)$$

The final keypoints are image-specific and contain person signature, pose, and expression information.

Driving video feature extraction 820 processes the driving images $\{d_1, d_2, \ldots, d_N\}$ in the same way as the processing of the source image s. To extract motion-related information, driving video feature extraction 820 applies the head pose estimator H to get $R_d$ and $t_d$, and applies the expression deformation estimator $\Delta$ to obtain $\delta_{d,k}$'s.

Instead of extracting canonical 3D keypoints from the driving image d using canonical 3D keypoint detection network L, driving video feature extraction 820 reuses $x_{c,k}$, which were extracted from the source image s. This is because the face in the output image needs to have the same identity as the one in the source image s. There is no need to compute them again. Finally, driving video feature extraction 820 combines the identity-specific information and the motion-related information, to compute the driving keypoints for the driving image d:

$$x_{d,k}=T(x_{c,k},R_d,t_d,\delta_{d,k})=R_d x_{c,k}+t_d+\delta_{d,k} \quad (2)$$

Driving video feature extraction 820 can apply this processing to each frame in the driving video, and each frame can be compactly represented by $R_d$, $t_d$, and $\delta_{d,k}$'s. This compact representation is useful for low-bandwidth video conferencing.

The source and driving keypoints can be used to generate videos (not shown in FIG. 8). For example, the source and driving keypoints can be aggregated and encoded into a bitstream transmitted to a decoder. The decoder can use the driving keypoints to warp the 3D source features fs, and convert the warped features to an output image.

The generative models used in framework 800 can be trained by minimizing various types of losses, such as perceptual loss, adversarial loss, GAN loss, equivariance loss, keypoint prior loss, head pose loss, deformation prior loss, etc. For example, perceptual loss can be used to encourage the reconstruct image to have a similar feature representation as the original image, by computing the difference on the feature domain. In some embodiments, to calculate the perceptual loss, the VGG19 model is used to transform the image to the feature domain The deep learning based generative compression algorithms, e.g., frameworks 700 and 800, can achieve relatively ultra-low bit-rate compression performance for face videos. In some embodiments, these frameworks can be further modified to optimize the balance between the coding bits and the generation quality. Particularly, the above-described frameworks 700 and 800 extract keypoints to represent the compact features for a given frame and encode the keypoints, which are then used by the decoder to generate output video. The coding bits increase as more keypoints are encoded while the distortion will increase if less keypoints are used. In order to strike a balance between the coding bits and the generation quality, the number of used keypoints can be fine-tuned based on the local features of the images.

Figure 9:
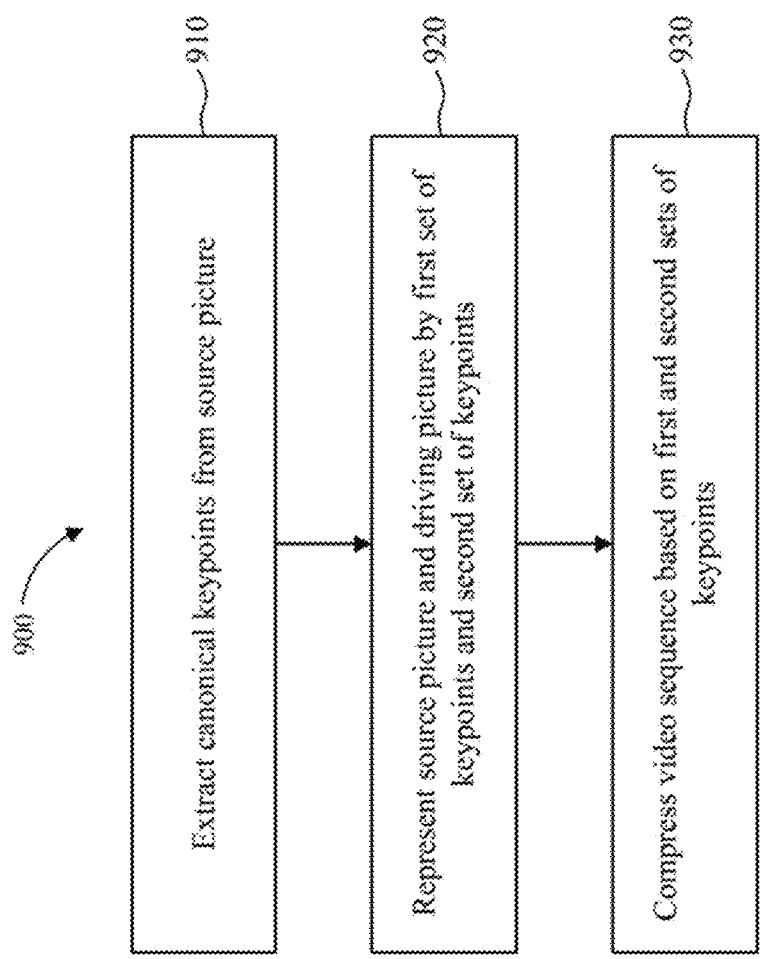
FIG. 9 is a flow chart of an exemplary method for compressing video data based on keypoint features, according to some embodiments of the present disclosure.

FIG. 9 is a flow chart of an exemplary method 900 for compressing video data based on keypoint features, according to some embodiments of the present disclosure. Method 900 can be performed by one or more computer processors of an apparatus (e.g., example apparatus of FIG. 11). As shown in FIG. 9, method 900 includes the following methods 910-930.

At step 910, the apparatus extracts a plurality of canonical keypoints from a source picture. In method 900, 3D keypoints are used to describe image features such as motion, geometry, pose, face expression. For example, the apparatus can extract a set of k 3D keypoints $x_{c,k}$ from the source picture using a canonical 3D keypoint detection network. k can be any value suitable for the video compression. For example, k can be set to be equal to 20. In the context of compressing face pictures, the extracted canonical keypoints are independent of the face's pose and expression, and are used for encoding a person's geometry signature in a neutral pose and expression.

At step 920, the apparatus represents each of the source picture and driving pictures by a first set of keypoints and a second set of keypoints. The first and second sets of keypoints can be selected based on the canonical keypoints extracted at step 910. As described above, a set of k 3D canonical keypoints can be used. If k is a small number, the number of keypoints cannot provide enough motion and geometry information, thereby causing degradation of the reconstruction quality. On the contrary, a large number of k brings higher precision but demands a larger amount of coding bits. To address this problem, each of the source picture and driving pictures can be represented by two sets of keypoints. The first set includes k keypoints, equal to the number of canonical keypoints. The second set includes less than or equal to k keypoints.

Specially, the apparatus decomposes the keypoint evolution between two pictures into global motion and local motion. The global motion is represented by a transformation of the canonical keypoints. The transformation can include at least one of a rotation of a translation of the canonical keypoints, as represented by the rotation vector R and the translation vector t, respectively. Given a set of k canonical keypoints, the keypoint derivation of one picture can be expressed as:

$$x_k = T(x'_k, R, t, \Delta) = Rx'_k + t + \Delta \quad (3)$$

where $x_k$ and $x'_k$ denote the k keypoints of the current picture and the canonical keypoints. The local motion $\Delta$ is termed a deformation or compensation to a subset of the canonical keypoints. For consistency and simplification, the local motion is represented by a set of p keypoint differences as $\Delta x_p$.

In the context of compressing face pictures, the global motion of the canonical keypoints represents a pose of a face in the source or driving picture, and the local motion of the canonical keypoints represents an expression of the face. Because the change of facial expression between two pictures often happen locally, it can be represented by a smaller number of keypoints than the k canonical keypoints.

Considering the local motion often appears in specific farcical parts, such as speaking and blinking, it is inferred that only part of keypoints will be influenced by the local motion. Inspired by this, the number of local keypoint differences $\Delta x_p$, and the number of canonical keypoints can be separate, and the value of p can be smaller than the value of k. In this manner, the keypoint derivation is formulated as:

$$x_k = T(x'_k, R, t, \Delta x_p) = Rx'_k + t + \Delta x_p (p \le k) \quad (4)$$

The separate numbers of local keypoint difference and the canonical keypoints are important for the task of compression. It utilizes the prior decomposition of keypoint evolution: global motion and partial compensation. This design promotes the realization that using more keypoints to represent and generate the face image while only a little difference needs to be signaled.

At step 930, the apparatus compresses a video sequence based on the first and second set of keypoints. The video sequence includes the above-described source and driving pictures. The apparatus encodes the global motion (rotation vector and translation vector) and the local motion (partial keypoint difference). At the decoder side, the features of each of the source and driving pictures can be obtained based on the canonical keypoints, as described in Equation (4).

The separate numbers of local keypoint difference and the canonical keypoints are important for the task of compression. It utilizes the prior decomposition of keypoint evolution: global motion and partial compensation. This design promotes the realization that using more keypoints to represent and generate the face image while only a little difference needs to be signaled.

Figure 10:
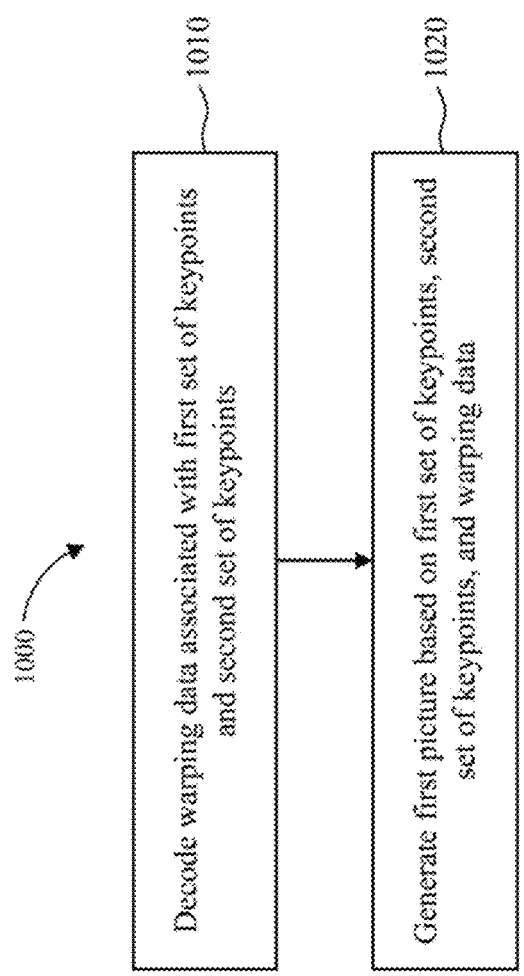
FIG. 10 is a flow chart of an exemplary method for decoding video data based on keypoint features, according to some embodiments of the present disclosure.

FIG. 10 is a flow chart of an exemplary method 1000 for decoding video data based on keypoint features, according to some embodiments of the present disclosure. Method 1000 can be performed by one or more computer processors of an apparatus (e.g., example apparatus of FIG. 11). As shown in FIG. 10, method 1000 includes the following methods 1010-1020.

At step 1010, the apparatus decodes warping data associated with a first set of keypoints and a second set of keypoints. The second set includes less keypoints than the first set. For example, the first set of keypoints can be k canonical keypoints extracted from a source picture, and the second set of keypoints can be a subset of the k canonical keypoints.

At step 1020, the apparatus generates a first picture based on the first set of keypoints, the second set of keypoints, and the warping data. For example, the first picture may be a driving picture, and the apparatus can generate the driving picture by warping one or more features of the source picture, based on the warping data. The warping data may include data descriptive of the above-described global motion and local motion of the canonical keypoints. In the context of face picture compression, the global motion relates to a pose of a face, and the local motion relates to an expression of the face.

The above-described video generative compression techniques use one or more neural networks to extract the keypoints and estimate the motions. In some embodiments, to train the generative models, the VGG19 model can be used to help calculate the perceptual loss. However, VGG19 is a pre-trained model training on the image-net dataset consisting of various images and may not be optimal for the face video compression.

To address this problem, in some embodiments, a method of combined perceptual loss for face video compression can be used. Specifically, perceptual loss is used in learning based compression tasks, to encourage the reconstructed image $I_{out}$ to have similar representations as the original image $I_{org}$. General perceptual loss is given by:

$$L(I_{out}, I_{org}, M) = \|T_M(I_{out}) - T_M(I_{org})\|_1 \quad (5)$$

where $T_M$ denotes the transformation from image to features by the pre-trained model M. In the example, at least two models are used to calculate the perceptual loss. One of the at least two models can be trained on the general images and another of the at least two models can be trained on the face images. For example, VGG19 is trained on the ImageNet and ArcFace is trained on the face datasets VoxCeleb2. In this manner, the perceptual loss is computed by:

$$L(I_{out}, I_{org}, M_1, M_2) = \lambda_1 \|T_{M_1}(I_{out}) - T_{M_1}(I_{org})\|_1 + \lambda_2 \|T_{M_2}(I_{out}) - T_{M_2}(I_{org})\|_1 \quad (6)$$

$M_1$ and $M_2$ are the two pre-trained models and $\lambda_1$ and $\lambda_2$ are the weight factors. For example, the values of $\lambda_1$ and $\lambda_2$ are set as 4 and 1 respectively. It is also noted that this example lies in the combination of at least two different models to compute the perceptual loss, and the models and weights can be adjusted according to the actual usage environments.

Figure 11:
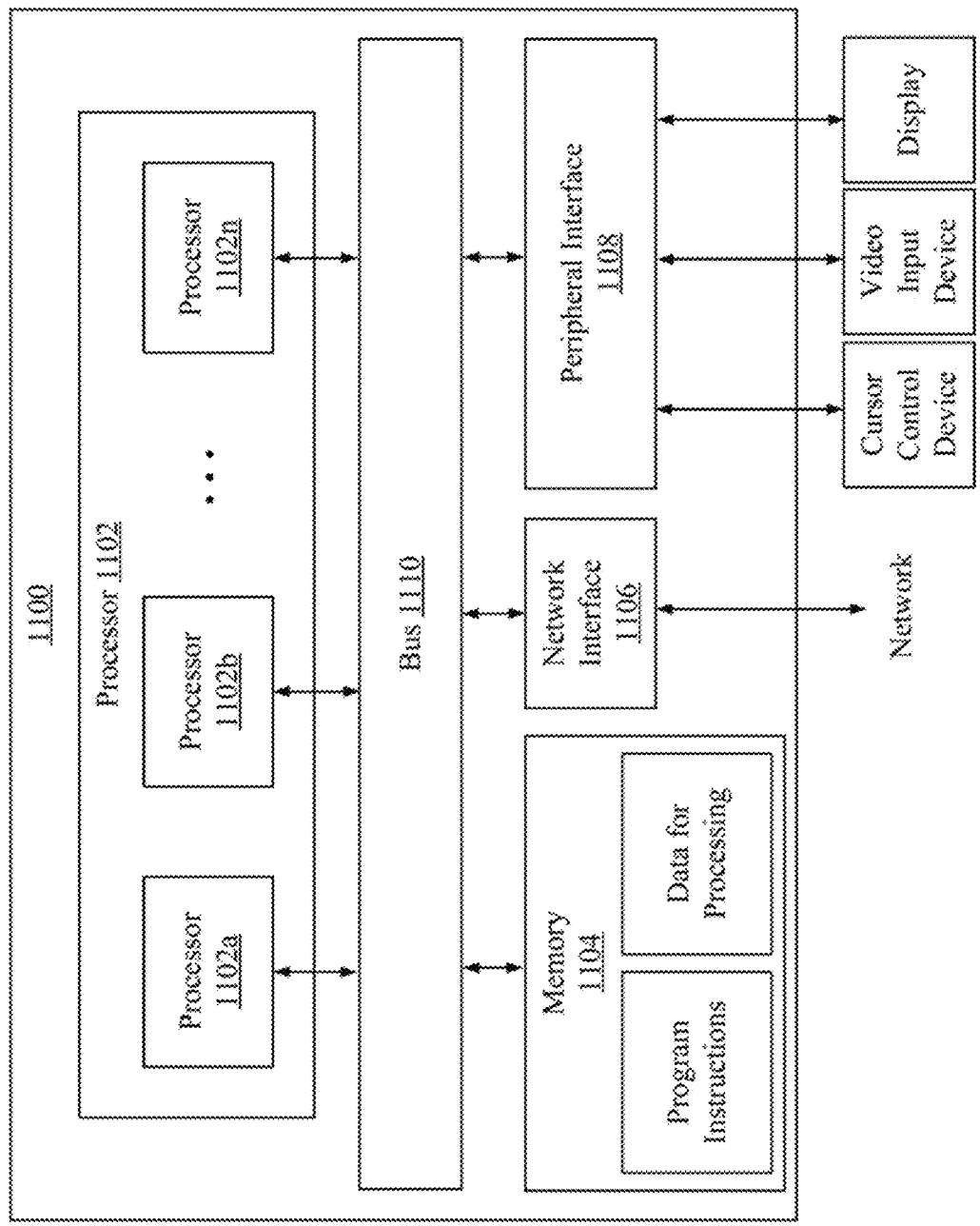
FIG. 11 is a block diagram of an exemplary apparatus for coding image data, according to some embodiments of the present disclosure.

FIG. 11 is a block diagram of an exemplary apparatus 1100 for coding image data, according to some embodiments of the present disclosure. Apparatus 1100 can be used to perform the above-described video compression methods. As shown in FIG. 11, apparatus 1100 can include processor 1102. When processor 1102 executes instructions described herein, apparatus 1100 can become a specialized machine for video encoding or decoding. Processor 1102 can be any type of circuitry capable of manipulating or processing information. For example, processor 1102 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 1102 can also be a set of processors grouped as a single logical component. For example, as shown in FIG. 11, processor 1102 can include multiple processors, including processor 1102*a*, processor 1102*b*, and processor 1102*n*.

Apparatus 1100 can also include memory 1104 configured to store data (e.g., a set of instructions, computer codes, intermediate data, or the like). For example, as shown in FIG. 11, the stored data can include program instructions (e.g., program instructions for implementing the methods described in the present disclosure. Processor 1102 can access the program instructions and data for processing (e.g., via bus 1110), and execute the program instructions to perform an operation or manipulation on the data for processing. Memory 1104 can include a high-speed random-access storage device or a non-volatile storage device. In some embodiments, memory 1104 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 1104 can also be a group of memories (not shown in FIG. 11) grouped as a single logical component.

Bus 1110 can be a communication device that transfers data between components inside apparatus 1100, such as an internal bus (e.g., a CPU-memory bus), an external bus (e.g., a universal serial bus port, a peripheral component interconnect express port), or the like.

For ease of explanation without causing ambiguity, processor 1102 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 1100.

Apparatus 1100 can further include network interface 1106 to provide wired or wireless communication with a network (e.g., the Internet, an intranet, a local area network, a mobile communications network, or the like). In some embodiments, network interface 1106 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 1100 can further include peripheral interface 1108 to provide a connection to one or more peripheral devices. As shown in FIG. 11, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs consistent with the present disclosure can be implemented as any combination of any software or hardware modules in apparatus 1100. For example, some or all stages of the disclosed methods can be implemented as one or more software modules of apparatus 1100, such as program instructions that can be loaded into memory 1104. For another example, some or all stages of the disclosed methods can be implemented as one or more hardware modules of apparatus 1100, such as a specialized data processing circuit (e.g., an FPGA, an ASIC, an NPU, or the like).

In some embodiments, a non-transitory computer-readable storage medium storing a bitstream is also provided. The bitstream can be encoded and decoded according to the above-described method of using separate keypoints for face video compression. For example, the bitstream can include a first set of keypoints and a second set of keypoints representing a first picture, and warping data associated with the first and second sets of keypoints. The first set keypoints may be k canonical keypoints extracted from a source picture. The second set of keypoints includes less number of keypoints than k. For example, the second set of keypoints may be a subset of the first set of keypoints. The first set of keypoints, the second set of keypoints, and the warping data can be decoded and used to generate a picture based on the above-described methods, e.g., method 1000 (FIG. 10).

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It is noted that the embodiments described in the present disclosure can be freely combined or used separately.

The embodiments may further be described using the following clauses:

1. A video compression method, comprising:
   receiving a video sequence;
   encoding one or more pictures of the video sequence, wherein the encoding comprises:
      representing a first picture by a first set of keypoints and a second set of keypoints, the second set comprising less keypoints than the first set; and
      compressing the video sequence based on the first set and second set of keypoints; and
   generating a bitstream associated with the compressed video sequence.
2. The video compression method of clause 1, wherein the second set of keypoints is a subset of the first set of keypoints, and representing the first picture by the first set of keypoints and the second set of keypoints comprises:
   transforming the first set of keypoints;
   determining a deformation to the second set of keypoints; and
   representing the first picture based on the transformed first set of keypoints and the deformation to the second set of keypoints.
3. The video compression method of clause 1, wherein transforming the first set of keypoints comprises performing at least one of a rotation or a translation of the first set of keypoints.
4. The video compression method of clause 1, wherein the first set of keypoints comprises canonical keypoints extracted from a second picture.
5. The video compression method of clause 4, wherein the first and second pictures comprises a representation of a face, and the canonical keypoints are independent of a pose and an expression of the face.

6. The video compression method of clause 1, wherein the first picture comprises a representation of a face, and representing the first picture by the first set of keypoints and the second set of keypoints comprises:
representing a pose of the face based on the first set of keypoints; and
representing an expression of the face based on the second set of keypoints.

7. The video compression method of clause 1, wherein the encoding further comprises:
generating, based on the first and second sets of keypoints, a reconstructed picture associated with the first picture; and
determining a quality loss of the reconstructed picture, based on a weighted combination of at least two models, wherein the at least two models are trained on different training datasets.

8. The video compression method of clause 7, wherein at least one of the training datasets comprises face pictures.

9. A video decoding method, comprising:
receiving a bitstream; and
decoding, using coded information of the bitstream, one or more pictures, wherein the decoding comprises:
decoding warping data associated with a first set of keypoints and a second set of keypoints, the second set comprising less keypoints than the first set; and
generating a first picture based on the first set of keypoints, the second set of keypoints, and the warping data.

10. The video decoding method of clause 9, wherein the second set of keypoints is a subset of the first set of keypoints.

11. The video decoding method of clause 9, wherein generating the first picture based on the first set of keypoints, the second set of keypoints, and the warping data comprises:
warping one or more features of a second picture, based on the warping data; and generating the first picture based on the warped one or more features.

12. The video decoding method of clause 11, wherein the first set of keypoints comprises canonical keypoints extracted from the second picture.

13. The video decoding method of clause 12, wherein the first and second pictures comprises a representation of a face, and the canonical keypoints are independent of a pose and an expression of the face.

14. The video decoding method of clause 9, wherein the first picture comprises a representation of a face, and generating the first picture based on the first set of keypoints, the second set of keypoints, and the warping data comprises:
generating a pose of the face based on the first set of keypoints; and
generating an expression of the face based on the second set of keypoints.

15. The video decoding method of clause 9, further comprising:
generating, based on the first and second sets of keypoints, a reconstructed picture associated with the first picture; and
determining a quality loss of the reconstructed picture, based on a weighted combination of at least two models, wherein the at least two models are trained on different training datasets.

16. The video decoding method of clause 15, wherein at least one of the training datasets comprises face pictures.

17. A non-transitory computer readable storage medium storing a bitstream of a video, the bitstream comprising:
a first set of keypoints and a second set of keypoints representing a first picture, the second set comprising less keypoints than the first set; and
warping data associated with the first and second sets of keypoints,
wherein the first set of keypoints, the second set of keypoints, and the warping data are used for generating the first picture.

18. The non-transitory computer readable storage medium of clause 17, wherein the second set of keypoints is a subset of the first set of keypoints, and the first picture is represented by a combination of:
a transformation of the first set of keypoints; and
a deformation to the second set of keypoints.

19. The non-transitory computer readable storage medium of clause 18, wherein the transformation of the first set of keypoints comprises at least one of a rotation or a translation of the first set of keypoints.

20. The non-transitory computer readable storage medium of clause 17, wherein the first set of keypoints comprises canonical keypoints extracted from a second picture.

21. The non-transitory computer readable storage medium of clause 20, wherein the first and second pictures comprises a representation of a face, and the canonical keypoints are independent of a pose and an expression of the face.

22. The non-transitory computer readable storage medium of clause 17, wherein the first picture comprises a representation of a face, and wherein:
a pose of the face is represented by the first set of keypoints; and
an expression of the face is represented by the second set of keypoints.

23. The non-transitory computer readable storage medium of clause 17, wherein the first and second sets of keypoints are generated based on a weighted combination of at least two loss models, wherein the at least two loss models are trained on different training datasets.

24. The non-transitory computer readable storage medium of clause 23, wherein at least one of the training datasets comprises face pictures.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video compression method, comprising:
   receiving a video sequence;
   encoding one or more pictures of the video sequence, wherein the encoding comprises:
      representing a first picture by a first set of keypoints and a second set of keypoints, the second set comprising less keypoints than the first set, the first set of keypoints comprising canonical keypoints extracted from a second picture; and
      compressing the video sequence based on the first set and second set of keypoints; and
   generating a bitstream associated with the compressed video sequence.

2. The video compression method of claim 1, wherein the second set of keypoints is a subset of the first set of keypoints, and representing the first picture by the first set of keypoints and the second set of keypoints comprises:
   transforming the first set of keypoints;
   determining a deformation to the second set of keypoints; and
   representing the first picture based on the transformed first set of keypoints and the deformation to the second set of keypoints.

3. The video compression method of claim 2, wherein transforming the first set of keypoints comprises performing at least one of a rotation or a translation of the first set of keypoints.

4. The video compression method of claim 1, wherein the first and second pictures comprises a representation of a face, and the canonical keypoints are independent of a pose and an expression of the face.

5. The video compression method of claim 1, wherein the first picture comprises a representation of a face, and representing the first picture by the first set of keypoints and the second set of keypoints comprises:
   representing a pose of the face based on the first set of keypoints; and
   representing an expression of the face based on the second set of keypoints.

6. The video compression method of claim 1, wherein the encoding further comprises:
   generating, based on the first and second sets of keypoints, a reconstructed picture associated with the first picture; and
   determining a quality loss of the reconstructed picture, based on a weighted combination of at least two models, wherein the at least two models are trained on different training datasets.

7. The video compression method of claim 6, wherein at least one of the training datasets comprises face pictures.

8. A video decoding method, comprising:
   receiving a bitstream; and
   decoding, using coded information of the bitstream, one or more pictures, wherein the decoding comprises:
      decoding warping data associated with a first set of keypoints and a second set of keypoints, the second set comprising less keypoints than the first set, the first set of keypoints comprising canonical keypoints extracted from a second picture; and
      generating a first picture based on the first set of keypoints, the second set of keypoints, and the warping data.

9. The video decoding method of claim 8, wherein the second set of keypoints is a subset of the first set of keypoints.

10. The video decoding method of claim 8, wherein generating the first picture based on the first set of keypoints, the second set of keypoints, and the warping data comprises:
    warping one or more features of a second picture, based on the warping data; and
    generating the first picture based on the warped one or more features.

11. The video decoding method of claim 10, wherein the first and second pictures comprises a representation of a face, and the canonical keypoints are independent of a pose and an expression of the face.

12. The video decoding method of claim 8, wherein the first picture comprises a representation of a face, and generating the first picture based on the first set of keypoints, the second set of keypoints, and the warping data comprises:
    generating a pose of the face based on the first set of keypoints; and
    generating an expression of the face based on the second set of keypoints.

13. The video decoding method of claim 8, further comprising:
    generating, based on the first and second sets of keypoints, a reconstructed picture associated with the first picture; and
    determining a quality loss of the reconstructed picture, based on a weighted combination of at least two models, wherein the at least two models are trained on different training datasets.

14. The video decoding method of claim 13, wherein at least one of the training datasets comprises face pictures.

15. A method of storing a bitstream of a video, the method comprising:
- generating a first set of keypoints and a second set of keypoints representing a first picture, the second set comprising less keypoints than the first set, the first set of keypoints comprising canonical keypoints extracted from a second picture;
- generating warping data associated with the first and second sets of keypoints, wherein the first set of keypoints, the second set of keypoints, and the warping data are used for generating the first picture;
- generating a bitstream comprising the warping data; and
- storing the bitstream in a non-transitory computer readable storage medium.

16. The method of claim 15, wherein the second set of keypoints is a subset of the first set of keypoints, and the first picture is represented by a combination of:
- a transformation of the first set of keypoints; and
- a deformation to the second set of keypoints.

17. The method of claim 16, wherein the transformation of the first set of keypoints comprises at least one of a rotation or a translation of the first set of keypoints.

\* \* \* \* \*